United States Patent
Yamazaki et al.

[11] Patent Number: 6,038,632
[45] Date of Patent: Mar. 14, 2000

[54] INTERRUPT CONTROL ON SMM

[75] Inventors: Hiroshi Yamazaki; Manabu Koarai; Naonobu Fujiwara, all of Tokyo; Toshikazu Morisawa, Tokorozawa, all of Japan

[73] Assignee: Kabushiki Kaisha Toshiba, Kawasaki, Japan

[21] Appl. No.: 09/073,265

[22] Filed: May 6, 1998

[30] Foreign Application Priority Data

May 7, 1997 [JP] Japan .................................. 9-116861
Aug. 29, 1997 [JP] Japan .................................. 9-234285

[51] Int. Cl.$^7$ ................................................ G06F 9/46
[52] U.S. Cl. ............................... 710/260; 710/104
[58] Field of Search .................................. 710/260, 261, 710/262, 104, 10; 713/1

[56] References Cited

U.S. PATENT DOCUMENTS

| | | | |
|---|---|---|---|
| 5,339,437 | 8/1994 | Yuen ........................................ | 710/261 |
| 5,671,422 | 9/1997 | Datta ........................................ | 710/261 |
| 5,764,999 | 6/1998 | Wilcox et al. ........................... | 710/261 |

FOREIGN PATENT DOCUMENTS 7-38591  2/1995  Japan .............................. H04L 11/00

Primary Examiner—Glenn A. Auve
Attorney, Agent, or Firm—Finnegan, Henderson, Farabow, Garrett & Dunner, L.L.P.

[57] ABSTRACT

In an initialization operation of a system, an I/O trap SMI is issued to a CPU, and CPU state map information is stored in a predetermined area in an SM-RAM. When an interrupt control process occurs during the activation of an OS, the CPU state map information formed in the initialization operation is set in the CPU, and the CPU operation mode is changed to an original mode in which interrupts from various I/O devices are enabled. In the original mode of the CPU, parallel processing using an interrupt is executed. Initialization commands are sequentially issued to a plurality of devices such as a KBC, an HDD, and a display controller. The KBC, the HDD, and the display controller generate command completion interrupt signals upon completion of the command processes for their initialization operations. Next commands are sequentially issued to devices which have generated the command completion interrupt signals. A plurality of devices are initialized in accordance with the command completion interrupt signals from these devices.

25 Claims, 16 Drawing Sheets

INTERRUPT CONTROL ON SMM

BACKGROUND OF THE INVENTION

This application is based on Japanese Patent Applications No. 9-234285, filed on Aug. 29, 1997 and No. 9-116861, filed on May 7, 1997 the contents of which are cited herein by reference.

The present invention relates to an interrupt control process for a computer system and, more particularly, to respective parallel processes during the interrupt control process.

In recent years, various laptop and notebook portable personal computers which can be operated by batteries have been developed. Generally in an initialization process of a personal computer, a memory and various I/O devices mounted on the computer are sequentially initialized. For example, in a notebook personal computer, the initialization process is executed by the following procedure in accordance with the POST routine of the BIOS, as shown in FIG. 1.

(1) Initialize Memory and Chip Set (step S100)
(2) Initialize Keyboard Controller (KBC) and Internal/External Keyboard (step S110)
(3) Initialize Display Controller and Detect External CRT (step S120)
(4) Initialize Hard Disk (step S130)
(5) Initialize Optional Device (step S140)

In initializing respective devices such as the keyboard controller, the display controller, and the hard disk, commands are frequently issued from the PST routine to the devices. The device receiving a command requires a given time to complete a process corresponding to the command. Every time the POST routine issues a command, it polls a device to which the command is issued, and checks whether the device completes the command process. After confirming the completion of the command process, the POST routine issues the next command to the device.

In this manner, in initializing each device, the issuing timing of the next command is delayed by a time necessary for the command process of the device. During this wait time, the POST routine can originally initialize another device.

In the conventional system, however, since a plurality of devices are sequentially initialized, the wait time in the initialization process of each device cannot be effectively used. The time required to initialize the entire system is therefore the sum of times (including wait times) necessary to initialize respective devices mounted on the system. The initialization process of the computer requires a long time.

Further, an interrupt control process of such a personal computer such as a rapid resume/suspend process of saving the current operation environment and returning the operation environment at the next start of the computer system or a docking/undocking process of connecting/disconnecting a docking station or an external device corresponding to a device bay during the energization of the computer system is executed as an interrupt control process during the operation of an operation system (to be referred to as an OS hereinafter).

According to the procedure of the conventional interrupt control process, when a power supply microcomputer incorporated in the computer system detects depression of a power supply switch, the power supply microcomputer issues an interrupt request to an interrupt control logic via an interrupt request line. Similarly, if a docking station and an extension device are respectively docked to the extension bus connector of the computer system main body and the device bay during the operation of the OS, each circuit for controlling the docking issues an interrupt request to the interrupt control logic.

Upon reception of the interrupt request, the interrupt control logic issues a system management interrupt (to be referred to as an SMI hereinafter) to a central processing unit (to be referred to as a CPU hereinafter).

When the CPU receives the SMI signal, the CPU operation mode shifts to a system management mode (to be referred to as an SMM hereinafter) to start an interrupt control process stored in the BIOS-ROM. The interrupt control process executes an interrupt control process corresponding to the interrupt signal requested from the CPU.

In a CPU available from Intel Corp., U.S.A., the SMM means a CPU operation mode set in shift of the CPU to the interrupt control process in the BIOS-ROM when an SMI# signal is input from the computer system to the CPU.

While the CPU is in the SMM, no computer system can request a new interrupt (e.g., IRQ, INTR, or SMI) from the CPU. The interrupt control process must directly execute a series of processes. When a time wait is required for a predetermined command process issued to various I/O devices, another process in the interrupt control process cannot be executed, and the process must wait a certain time.

A rapid suspend process will be described as an example of the interrupt control process with reference to FIG. 2. The rapid suspend process is made up of the following five processes.

(1) Panel Light Off Sequence Process (S200)
(2) HDD Motor Off Sequence Process (S210)
(3) Saving Sequence Process of Various I/O Device Registers (S220)
(4) Memory Check Sum (S230)
(5) Rewrite of Flash ROM (S240)

In sequence processes (1) through (3), a certain time is required for various I/O devices receiving commands to complete processes corresponding to the commands. The next sequence cannot be executed until each sequence process is completed.

In each sequence process, the timing of the next sequence process is delayed by a time necessary for the command process of the device. The time required to execute the interrupt control process (rapid suspend process) of the system using the SMM is as long as the sum of times (including wait times) corresponding to the commands of respective sequence processes.

To accept a power on/off request from an I/O device (power supply microcomputer) of the computer system during the rapid suspend process, the presence/absence of the request from the power supply microcomputer is checked by polling (S250) during the rapid suspend process, so the process cannot be performed timely.

As described above, in the conventional system, when the interrupt control process is to be executed during the SMM, another interrupt request cannot be accepted, so the interrupt control process is time-consuming.

Since no interrupt request from another I/O device can be accepted during the interrupt control process, a special process of polling various I/O devices and checking the presence/absence of a request must be performed.

As described above, in the conventional system, only two, specific and another devices can be initialized parallel. In a system configuration in which a plurality of devices require wait periods for their initialization operations, the initialization time is difficult to satisfactorily shorten.

BRIEF SUMMARY OF THE INVENTION

It is an object of the present invention to enable an interrupt in a CPU operation mode during an SMM in which no interrupt is accepted, and to shorten the total processing time of an interrupt control process by performing necessary processes parallel during the interrupt control process.

It is another object of the present invention to provide a computer system in which a plurality of devices can be initialized parallel in consideration of wait periods for the devices, and the initialization processing time can be satisfactorily shortened, and an initialization method.

According to the present invention, there is provided a computer system for executing a predetermined process in a system management mode in which no interrupt request is accepted, comprising means for generating a system management interrupt request during operation of an OS, means for changing an operation mode of a CPU to the system management mode in response to the system management interrupt request, means for setting the mode of the CPU to an interrupt usable mode after the mode of the CPU is changed to the system management mode, and means for executing an interrupt control process in the interrupt request usable mode.

According to this arrangement, CPU state map information is saved in a memory in initializing the system. Upon reception of the system management interrupt request during the activation of the OS, the operation mode of the CPU is changed from the system management mode to the interruptible mode, and an interrupt control process is executed in the interruptible mode. Necessary processes can be performed parallel during the interrupt control process, and the total processing time of the interrupt control process can be shortened.

According to the present invention, there is provided a computer system having a plurality of devices to execute an initialization process of the devices upon turning on a power supply, comprising means for sequentially issuing initialization commands to the plurality of devices, and command issuing means for detecting completion of a command process for each device by using command completion interrupt signals from the plurality of devices, and sequentially issuing next initialization commands to devices which have completed the command processes.

In this computer system, the completion of the. command process is detected for each device by using the command completion interrupt signal from each device in order to initialize the plurality of devices parallel.

More specifically, initialization commands are sequentially issued to a plurality of devices to be initialized parallel. Each device executes a command process for its initialization operation, and upon completion of the process, generates the above-described command completion interrupt signal. The next commands are sequentially issued to devices which have generated the command completion interrupt signals. In this manner, initialization processes of a plurality of devices progress in accordance with the command completion interrupt signals from the devices. A plurality of devices can be initialized parallel in consideration of wait times for the initialization operations of the devices.

According to the present invention, there is provided a computer system having a plurality of devices to execute an initialization process of the devices upon turning on a power supply, comprising means for detecting a timing at which each device can shift to a next command process, by using counter values of a plurality of counters each for managing a time required to shift from a current command process to a next command process for each device, command issuing means for sequentially issuing next initialization commands to devices detected that they can shift to the next command processes, and means for, every time the command issuing means issues the commands, resetting counter values corresponding to the devices to which the commands are issued.

In this computer system, the counter value of the counter prepared for each device is used instead of the interrupt signal described above. By the counter value, the timing at which the device can shift to the next command process is detected for each device. An initialization process of each device progresses in synchronism with the detected timing. Also in this case, a plurality of devices can be initialized parallel in consideration of wait times for the initialization operations of the devices.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinbefore.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will be described below with reference to the several views of the accompanying drawing.

Figure 1:
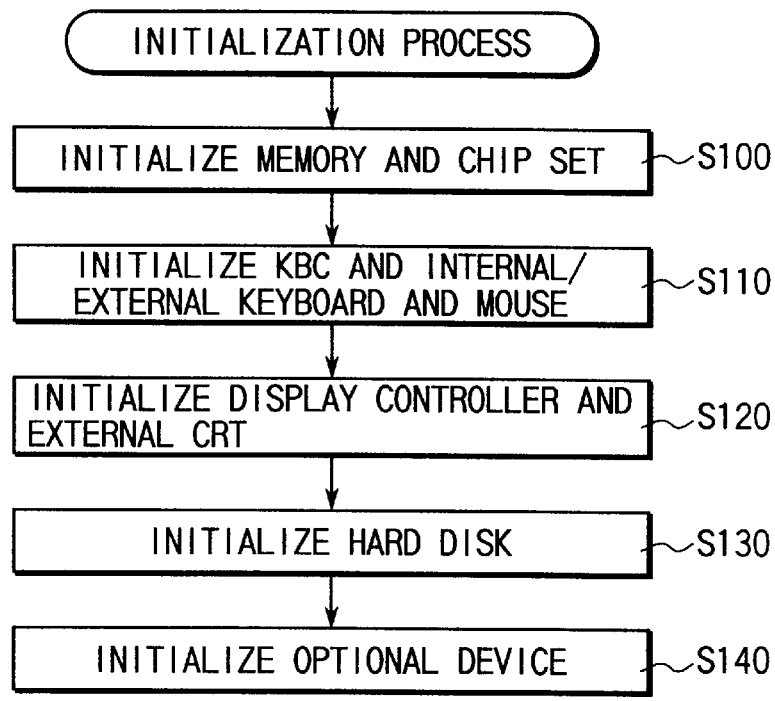
FIG. 1 is a flow chart showing the procedure of an initialization process of a conventional computer system.
Figure 2:
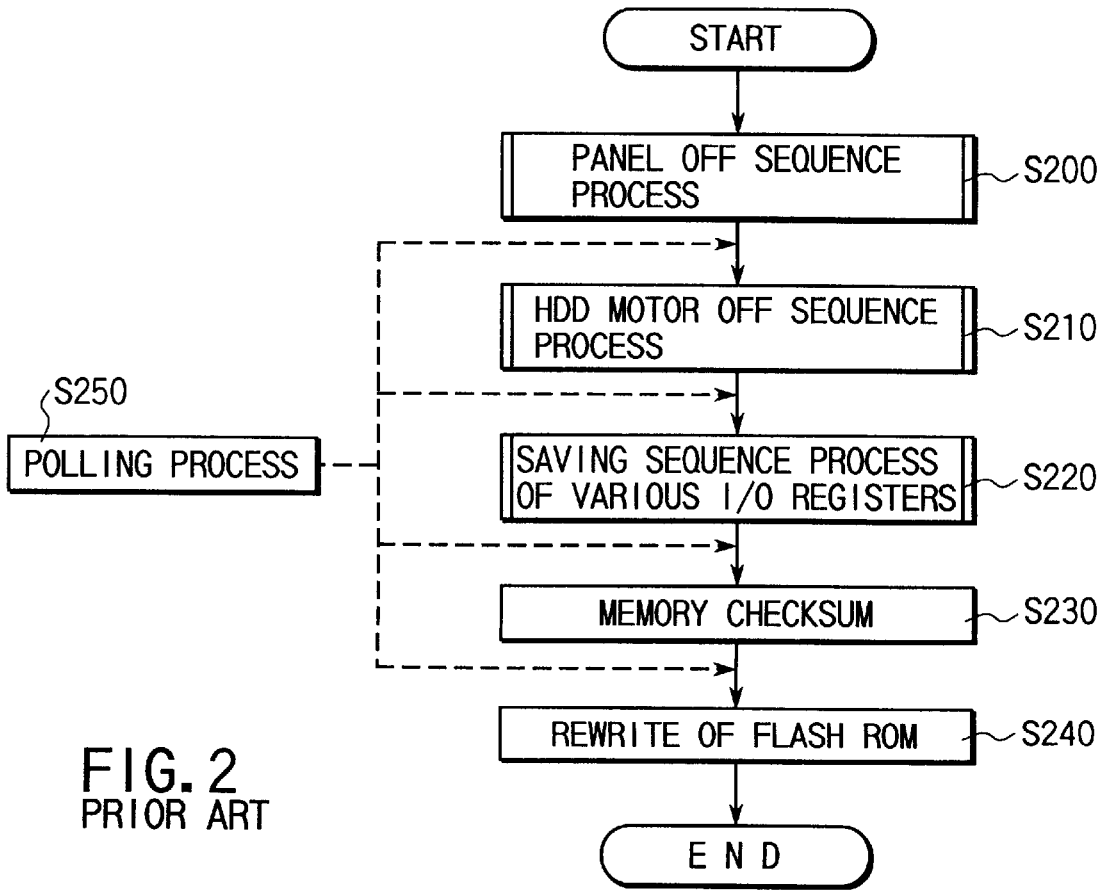
FIG. 2 is a flow chart showing the procedure of an interrupt control process during the activation of a conventional OS.
Figure 3:
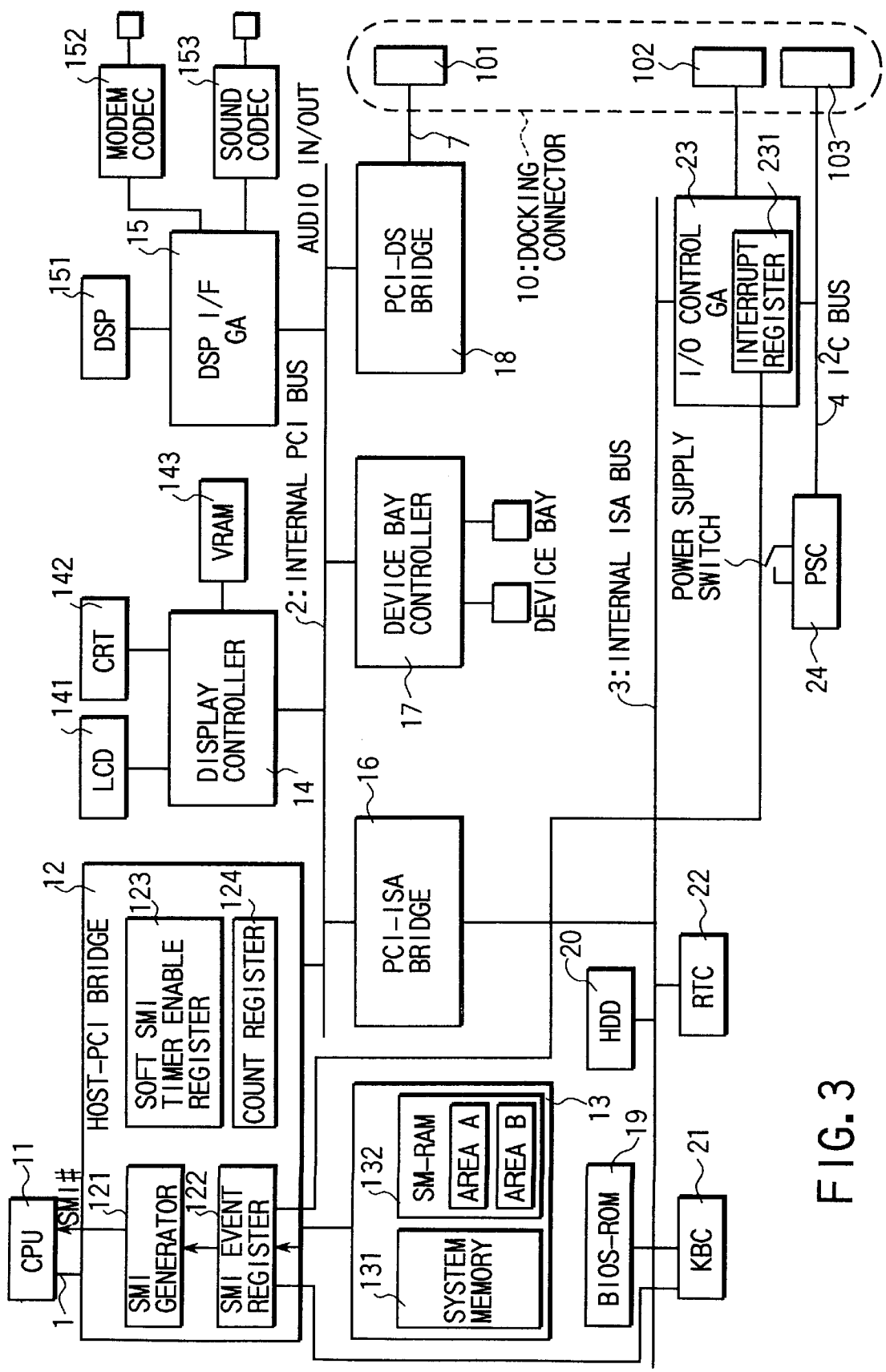
FIG. 3 is a block diagram showing the system configuration of a computer system according to an embodiment of the present invention.

FIG. 3 shows the arrangement of a computer system according to an embodiment of the present invention. This computer system is a notebook or laptop portable computer which can be driven by a battery. A processor bus 1, an internal PCI bus 2, an internal ISA bus 3, and an I²C bus 4 are arranged on the system board of the portable computer. If necessary, the user connects a docking station 30 shown in FIG. 4 as an expansion unit for extending functions to a docking connector 10 arranged on the portable computer main body. As shown in FIG. 3, the docking connector 10 is made up of three connector elements 101, 102, and 103.

The computer main body incorporates a CPU 11, a host-PCI bridge 12, a memory 13, a display controller 14, a DSP interface gate array (to be referred to as a DSP IF GA hereinafter) 15, an internal PCI-ISA bridge 16, a device bay controller 17, a PCI-DS (Docking Station) bridge 18, a BIOS-ROM 19, a hard disk drive 20, a keyboard controller 21, a real time clock (to be referred to as an RTC hereinafter) 22, an I/O control gate array 23, and a power supply controller (to be referred to as a PSC hereinafter) 24.

Figure 4:
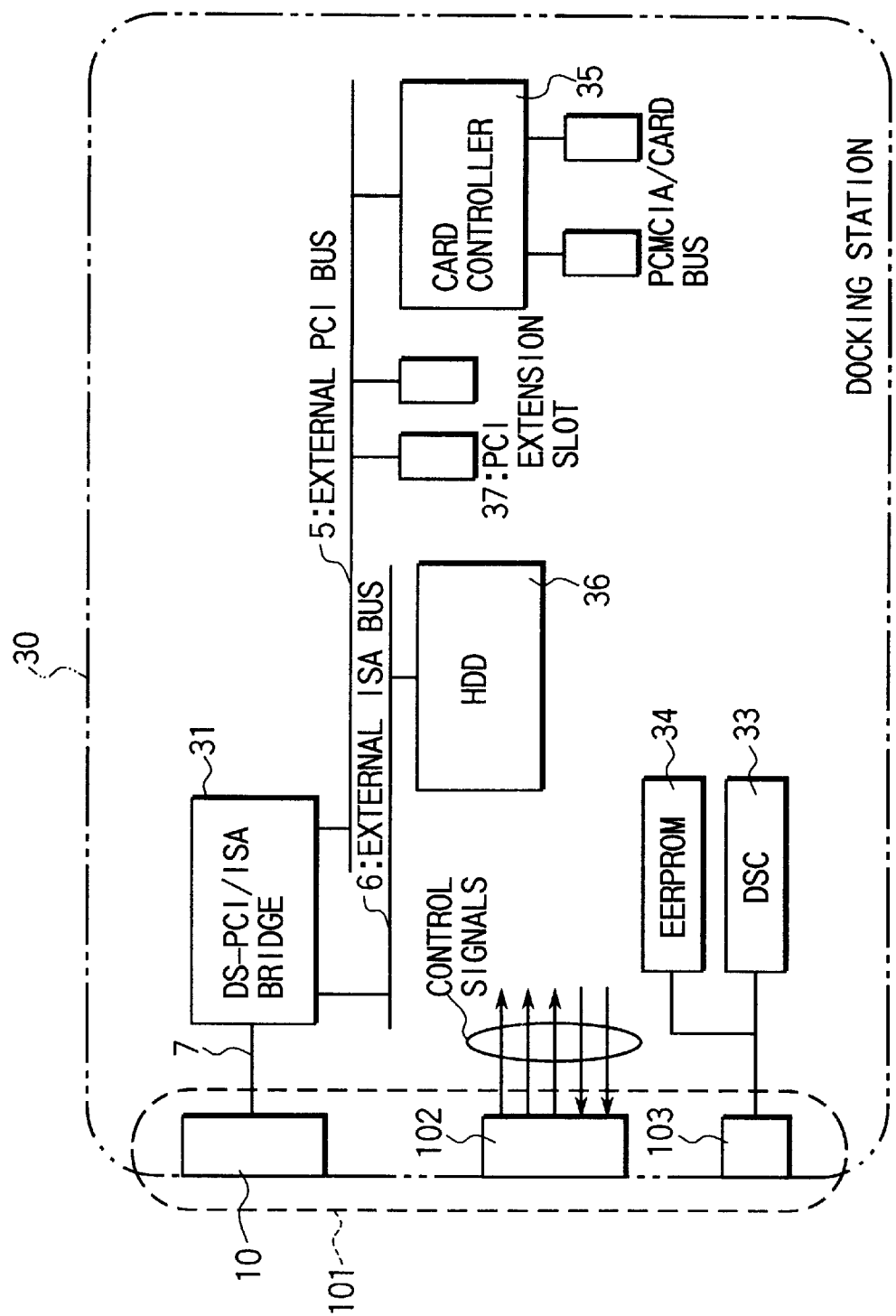
FIG. 4 is a block diagram showing the arrangement of a docking station used in the system of the embodiment.

The docking station 30 is used to add an expansion device such as a PCI expansion card, an ISA expansion card, a PC card, a hard disk drive, or a CD-ROM drive. As shown in FIG. 4, an external PCI bus 5 and an external ISA bus 6 are arranged as expansion buses in the docking station 30, and connected to a PCI expansion slot and an ISA expansion slot, respectively. In FIG. 4, a hard disk driver 36 is connected to the external ISA bus 6.

A DS-PCI/ISA bridge 31, a DS controller 33, an EEPROM 34, and the like are also arranged in the docking station 30.

The functions and arrangements of the respective components arranged in the computer main body of FIG. 3 will be explained below.

The CPU 11 is realized by, e.g., a microprocessor "pentium" available from Intel Corp., U.S.A. The processor bus 1 directly connected to the I/O pins of the CPU 11 has a 64-bit data bus.

The host-PCI bridge 12 is a bridge LSI connecting the processor bus 1 and the internal PCI bus 2, and functions as one of bus masters of the PCI bus 2. The host-PCI bridge 12 has the function of bidirectionally converting a bus cycle including data and addresses between the processor bus 1 and the internal PCI bus 2, and the function of controlling access to the memory 13 via a memory bus.

The host-PCI bridge 12 incorporates an interrupt control circuit for issuing an interrupt to the CPU 11. This circuit is made up of an SMI generator 121, an SMI factor register 122, a soft SMI timer enable register 123, and a count register 124.

The SMI generator 121 issues an SMI# signal to an SMI# pin of the CPU 11 in accordance with the on/off operation of the power supply switch, the docking/undocking operation of the docking station, or an H/W interrupt from a hot key.

The SMI factor register 122 is connected to the SMI generator 121 to identify an occurrence factor of the SMI. The SMI factor register 122 stores status bits representing the on/off operation of the power supply switch, the docking/undocking operation of the docking station, and the H/W interrupt from the hot key.

The soft SMI timer enable register 123 enables the start of the count-down of the count register 124.

A value obtained by subtracting the current time from the earliest time of the next start time values in respective sequence tables (to be described later) is set in the count register 124. When the counter value reaches "0", the count register 124 issues the SMI# signal to the CPU 11.

The memory 13 is a memory device in which an operating system, device drivers, application programs to be executed, processing data, and the like are stored, and is made up of a plurality of DRAM modules.

The memory 13 is constituted by a system memory 131 mounted on the system board in advance, and an SM-RAM 132 used as part of the system memory.

As DRAM modules constituting the system memory 131 and the SM-RAM 132, high-speed memories such as a synchronous DRAM and a Rambus to which a memory clock must be supplied for each bank are used.

The SM-RAM 132 is made up of a nonvolatile memory or a 64-kbyte memory baked up. Areas A and B for storing CPU state maps (to be described later), and sequence tables for performing interrupt control processes parallel are set in the SM-RAM 132.

Password information input by the user at the start of the system, and an SMI handler for designating a jump address to the BIOS-ROM 19 at the start of the SMM are further stored in the SM-RAM 132.

The memory 13 is connected to the host-PCI bridge 12 via a dedicated memory bus having a 32-bit or 64-bit data bus. As the data bus of the memory bus, the data bus of the processor bus 1 can also be used. In this case, the memory bus is made up of an address bus and various memory control signal lines.

The internal PCI bus 2 is a clock synchronous I/O bus. All cycles on the internal PCI bus 2 are synchronized with PCI bus clocks. The PCI bus clock has the maximum frequency of 33 MHz. The PCI bus 2 has an address/data bus used time-divisionally. The address/data bus has a 32-bit width.

The data transfer cycle on the PCI bus 2 is constituted by an address phase and one or more subsequent data phases. In the address phase, an address and the type of transfer are output; in the data phase, 8-bit, 16-bit, 24-bit, or 32-bit data is output.

The display controller 14 is one of bus masters of the PCI bus 2, similar to the host-PCI bridge 12. The display controller 14 displays image data in a video memory (VRAM) 143 on an LCD 141 or an external CRT display 142.

The DSP interface gate array 15 is one of PCI devices, and constitutes a digital signal processor (DSP) system for performing various sound processes and telephone/data communication processes in cooperation with a DSP 151, a modem (CODEC) 152, and a sound CODEC 153.

The DSP interface gate array 15 communicates with the DSP 151, the modem (CODEC) 152, and the sound CODEC 153 under the control of dedicated device driver programs read in the memory 13 and executed, and controls a sound process and a communication process using the digital signal process function of the DSP 151.

The internal PCI-ISA bridge 16 is a bridge LSI connecting the internal PCI bus 2 and the internal ISA bus 3, and functions as one of the PCI devices. The internal PCI-ISA bridge 16 incorporates a PCI bus arbiter, a DMA controller, and the like. The BIOS-ROM 19, the HDD 20, the keyboard controller 21, the RTC 22, and the I/O control gate array 23 are connected to the internal ISA bus 3.

The device bay controller 17 is one of the PCI devices and controls a docked external expansion device with device bay specifications.

The PCI-DS bridge 18 controls connection/disconnection of a bus to/from the docking station 30. More specifically, the PCI-DS bridge 18 is a bridge LSI connecting the internal PCI bus 2 to a docking bus 7 equivalent to a PCI bus, and functions as one of the PCI devices. The docking bus 7 is led outside via the connector element 101 of the docking connector 10 and connected to the docking station 30.

The BIOS-ROM 19 stores a system BIOS (Basic I/O System), and is made up of a flash memory (EEPROM) so as to enable rewrite of a program. The system BIOS includes an IRT routine (POST) executed at the boot of the system, device drivers (run time) for controlling various I/O devices, a system management program (SM-BIOS) for executing an interrupt control process, a setup routine, and password information set by the user.

The system management program is an interrupt program executed in the SMM, and includes an SMI handler and various SMI service routines such as a hot key process routine. The SMI handler starts the SMI service routine in accordance with an SMI generation factor. When the SMI occurs due to the hot key, the SMI handler activates the hot key process routine. When the SMI occurs due to another factor, the SMI handler activates an SMI service routine corresponding to the factor. In the embodiment of the present invention, the SM-BIOS issues the SMI# signal to the CPU 11 in accordance with an I/O trap instruction and a soft SMI timer, and executes an interrupt control process from the SMI service routine.

The hard disk drive (HDD) 20 is a primary HDD which is connected to the internal ISA bus 3 and stores an operating system (to be referred to as an OS hereinafter). The hard disk drive 20 is in an access-locked state by an access locking mechanism. The hard disk drive 20 is constituted by a hard disk controller for controlling an input/output to/from the system, a memory for storing a password, and a medium which can store data of the computer system.

The I/O control gate array 23 is a bridge LSI connecting the internal ISA bus 3 and the $I^2C$ bus 4, and incorporates a plurality of register groups readable/writable by the CPU 11. By using these register groups, the CPU 11 can communicate with the power supply controller 24 on the $I^2C$ bus 4, and the DS controller 33.

A plurality of control signal lines connected to the docking station 30 are led outside from the I/O control gate array 23 via the connector element 102 of the docking connector 10. The I/O control gate array 23 detects the docking/undocking state between the computer main body and the docking station 30. When the docking station 30 is connected while the computer main body is in a power-on state, the I/O control gate array 23 controls the docking station 30 so as not to destroy an expansion unit in the docking station 30 or cause the malfunction of the system due to insertion/removal of a hot line.

The I/O control gate array 23 incorporates an interrupt register 231, in which data representing the ON/OFF state of the power supply switch and data representing the docking/undocking state of the docking station 30 are respectively set via the power supply controller 24 and the DS controller 33.

The $I^2C$ bus 4 is a bidirectional bus made up of one clock signal line and one data line (SDA), and is led outside via the connector element 103 of the docking connector 10.

The power supply controller 24 powers on/off the computer main body in accordance with the ON/OFF state of the power supply switch. The power supply controller 24 also controls the power supply in accordance with the docking/undocking state of the docking station 30.

The components of the docking station 30 in FIG. 4 will be described below.

Figure 5:
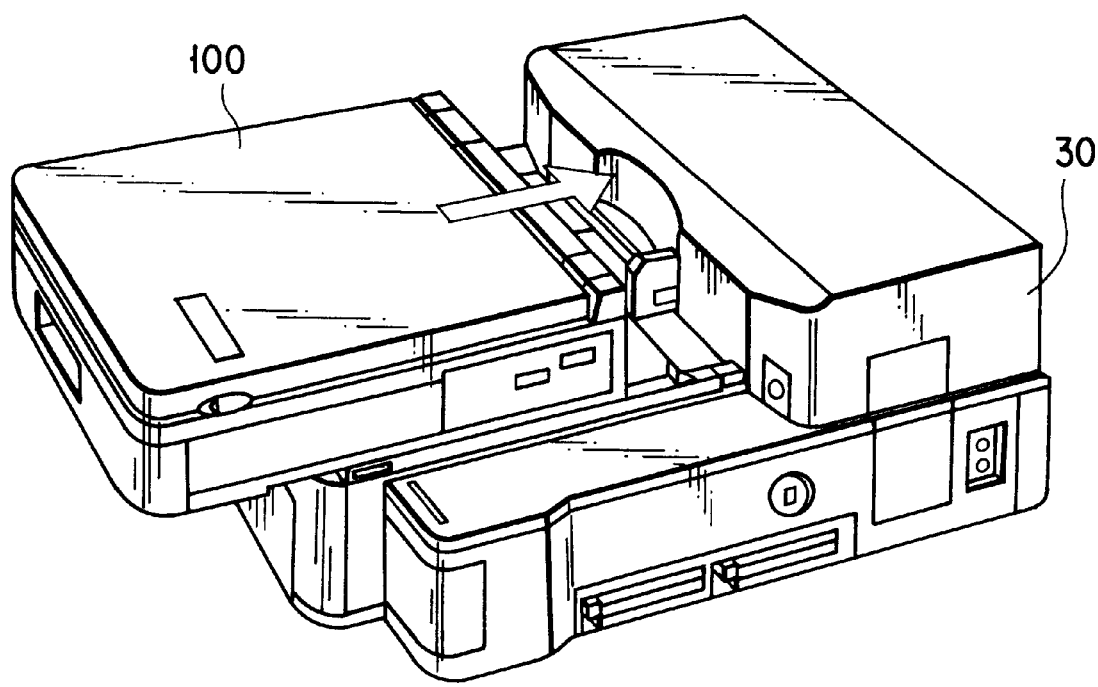
FIG. 5 is a view showing the state wherein the computer main body of the embodiment is mounted on the docking station.

As described above, the docking station 30 is an expansion unit which can be detachably mounted on the portable computer main body. FIG. 5 shows the state wherein the computer main body is mounted in the docking station 30.

The DS-PCI/ISA bridge 31 arranged inside the docking station 30 having the outer appearance in FIG. 5 is a bridge LSI connecting the docking bus 7 led from the computer main body to the docking station 30, the external PCI bus 5, and the external ISA bus 6. The DS-PCI/ISA bridge 31 is one of the PCI devices.

The docking station (DS) controller 33 is a microcomputer for controlling the ON/OFF state of the power supply of the docking station 30, and the docking/undocking state between the portable computer main body and the docking station 30. The DS controller 33 communicates with the I/O control gate array 23 of the computer main body using the $I^2C$ bus 4.

The EEPROM 34 stores PnP information necessary for "plug and play", such as attributes (e.g., address, DMA channel, and IRQ number) of an expansion card or the like inserted in the expansion slot of the docking station 30. The PnP information is read from the EEPROM 34 by the I/O control gate array 23 via the $I^2C$ bus 4 under the control of the system BIOS of the BIOS-ROM 19 when the computer main body is docked to the docking station 30, or the computer main body or the docking station 30 is powered on.

A card controller 35 controls a PC card complying with a PCMCIA/card bus, similar to the card controller 17 in the computer main body.

The operation of the computer system in FIG. 3 upon powering on (initializing) the computer system will be described with reference to FIGS. 6 through 14.

Figure 6:
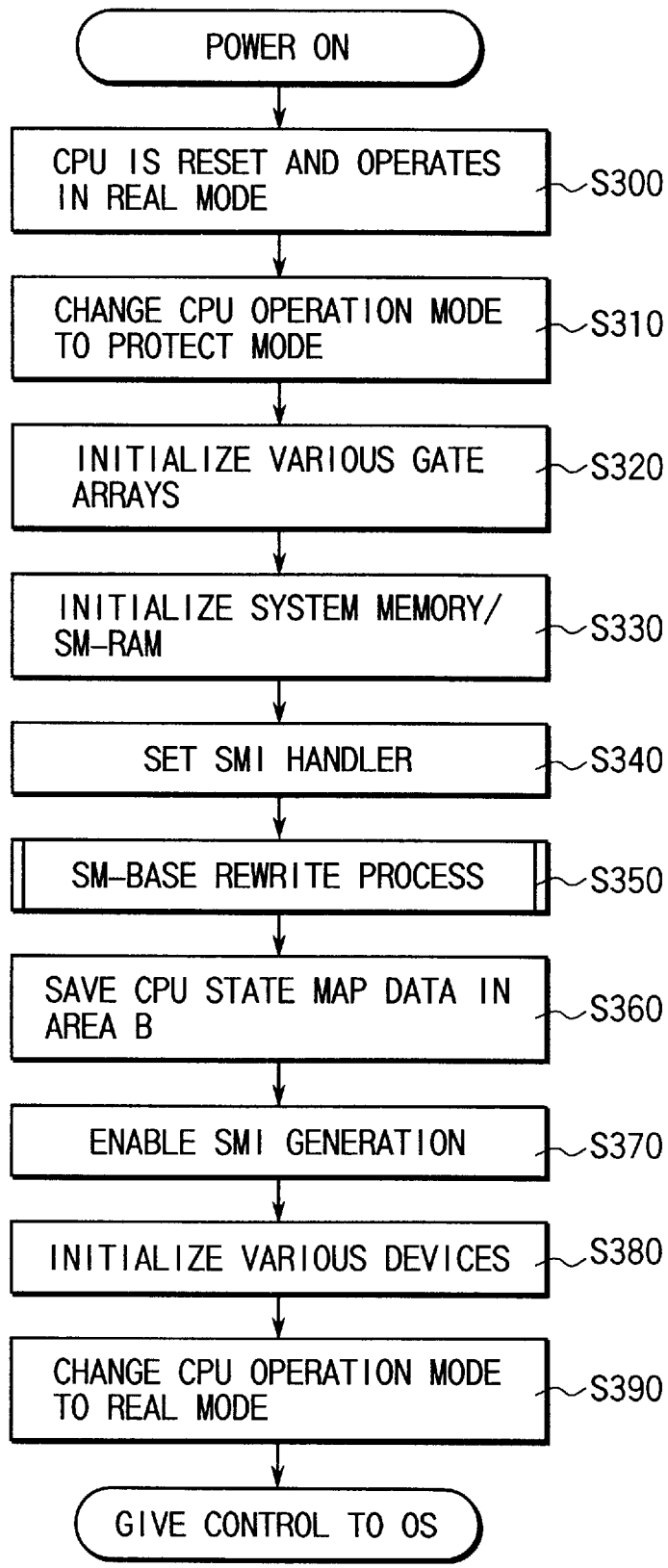
FIG. 6 is a flow chart showing the procedure of an operation upon turning on the power supply (initialization process) in the system of the embodiment.

When the computer system in FIG. 3 is powered on, the CPU 11 is reset and starts operating in a real mode (S300 in FIG. 6). Upon powering on the system, the system BIOS in the BIOS-ROM 19 is allocated to CPU memory addresses F0000 through FFFFF, and the CPU 11 fetches an instruction at address FFFF0. Accordingly, the POST (Power On Self Test) routine of the system BIOS starts in the real mode environment.

The POST routine changes the operation mode of the CPU 11 to a protect mode by, e.g., setting a machine status word (MSW) register of the CPU 11 (S310). In the protect mode, the POST routine executes an initialization process of various gate arrays and the like of the computer system, and read/write compare check of the system memory 131/SM-RAM 132. This initialization process is executed in series without any command completion wait or any time wait, and includes memory initialization, a register setting process, optional ROM execution, and the like (S320 and S330).

Figure 14:
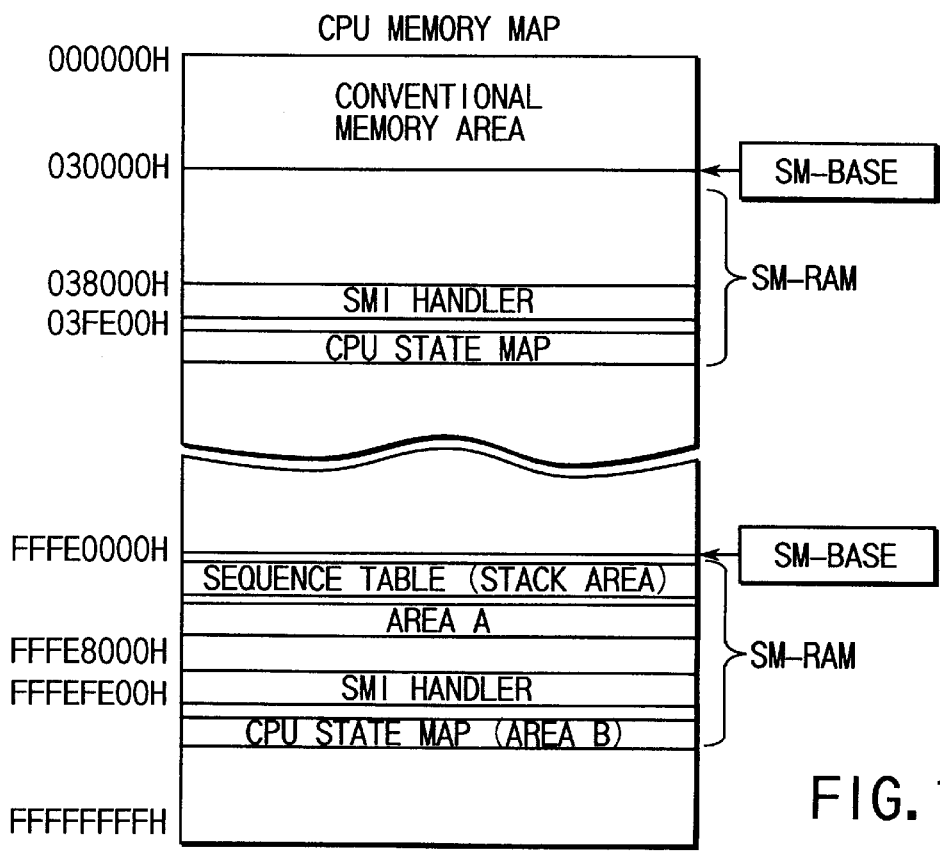
FIG. 14 is a block diagram showing a CPU memory map in the system of the embodiment.

As shown in FIG. 14, the SM-RAM 132 is allocated to 30000H by an SM-BASE register at the start of initialization of the POST routine. To set a far jump address to the SM-BIOS when an SMI# signal is issued to the CPU 11, the SMI handler allocated to 38000H is executed to set the far jump address (S340).

Figure 13:
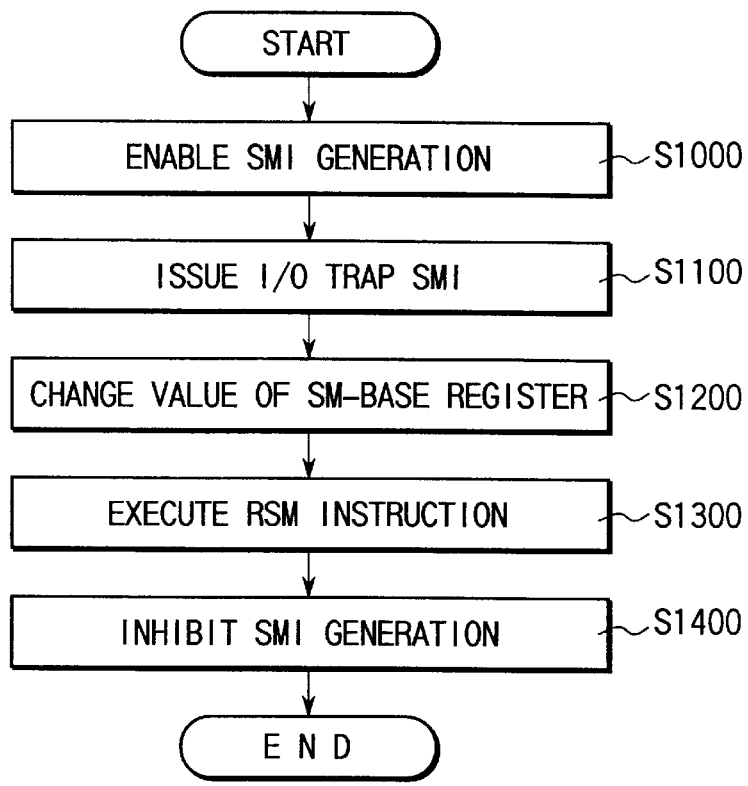
FIG. 13 is a flow chart showing the procedure of an SM-BASE register value rewrite process operation in the system of the embodiment.

To change the allocation of the CPU memory map of the SM-RAM 132 after the SMI# signal is issued to the CPU 11, the POST routine enables the SMI generator 121 and allows issuing of the SMI# signal from the SMI generator to the CPU 11 (S1000 in FIG. 13).

The POST routine sets a BIOS function call in an AH register of the CPU, sets an interrupt trap at a specific I/O address, and issues an SMI# signal (to be referred to as an I/O trap SMI hereinafter) to the CPU 11 (S1100).

Along with the issuing of the SMI# signal to the CPU 11, a CPU state map upon occurrence of an interrupt is automatically stored in 512 bytes from address 3FE00H, and the SMI handler is called. The SMI handler activates the SM-BIOS at the far jump address set in the SMI handler, and changes the allocation of the CPU memory map of the SM-RAM 132.

The CPU state map is used to save the current state of the CPU upon the issuing of the SMI# signal in a predetermined area in the SM-RAM 132 in issuing an SMI# signal to the CPU 11 and shifting the operation mode of the CPU 11 to the SMM, and to restore the information saved in this area to the CPU 11 in escaping from the SMM.

The SM-BIOS rewrites the SM-BASE register value to FFFE0000H (S1200). As shown in FIG. 14, the CPU memory map of the SM-RAM 132 set by the rewrite of the SM-BASE register value is allocated to 64 kbytes from address FFFE0000H.

After rewriting the SM-BASE register value, the SM-BIOS executes an RSM instruction to inhibit the generation of a subsequent SMI# signal (S1300 and S1400).

The POST routine returning from the SM-BASE register value rewrite interrupt process writes the CPU state map stored in 512 bytes from address 3FE00H in a 512-byte area B from address FFFEFE00H in the SM-RAM 132 in order to form an original interruptible mode of the CPU 11 (S360).

The original interruptible mode of the CPU 11 means a state wherein all interrupts (e.g., IRQ and NMI) including the SMI are enabled and can be managed by the system BIOS.

To allow issuing of the SMI# signal from the SMI generator to the CPU 11, the POST routine enables the SMI generator 121 and initializes various devices (sets set values to various devices). This initialization process requires a command completion wait and a time wait, and includes an initialization process of respective devices (e.g., HDD, FDD, and KBC) using an interrupt. Initialization processes in step S380 are independently performed for respective devices. During the initialization process in step S320, the POST routine shifts to the SMM using the I/O trap SMI (to be described in detail below) to start the process. When all initialization processes executed parallel become in a time wait or command completion wait, the shortest one of the initialization process stop times is set in a software SMI, and the system management interrupt process ends (S370 and S380).

Upon completion of the specific value setting process of various devices, the POST routine changes the operation mode of the CPU 11 from the protect mode to the real mode by, e.g., setting the MSW register of the CPU 11, and activates the OS (S390).

Note that each sequence table comprises an area (stack area) for saving stack information and register information for executing one task by a soft SMI and saving the state when the routine returns to the main routine. That is, in returning to the main routine, the contents of the register file and the contents of the stack in a currently executed interrupt process are stored in the stack area. When the interrupt process resumes next time, the interrupt process can be continuously performed by referring to the contents of the register file and the contents of the stack file which are stored in the stack area.

Initialization of various devices in S380 of FIG. 6 will be explained with reference to FIGS. 7 through 12.

Figure 7:
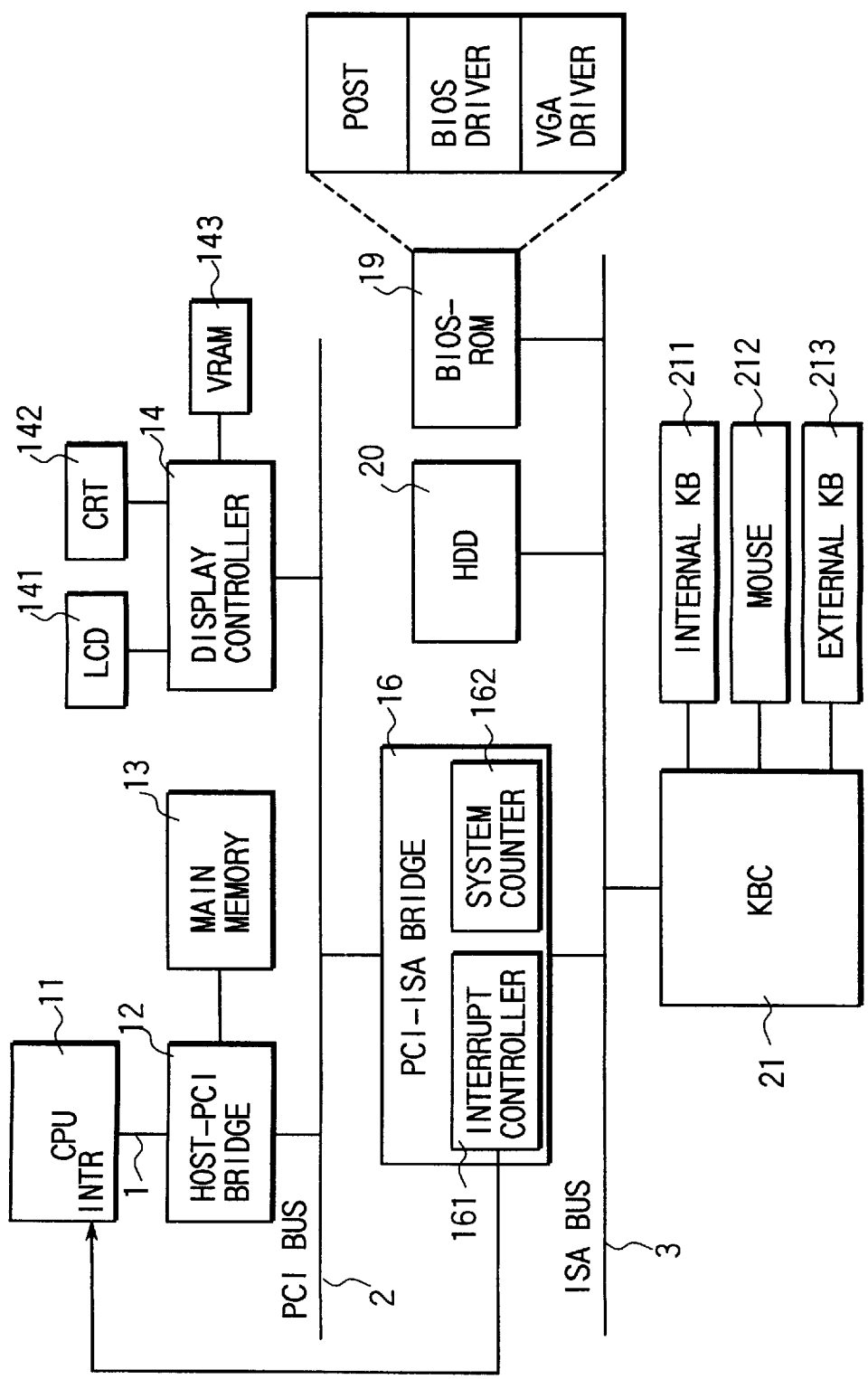
FIG. 7 is a block diagram mainly showing, of the system block diagram shown in FIG. 3, a PCI-ISA bridge, a KBC, and a BIOS-ROM in detail.

FIG. 7 is a block diagram mainly showing, of the system block diagram in FIG. 3, the PCI-ISA bridge 16, the KBC 21, and the BIOS-ROM 19 in detail. The same reference numerals as in FIG. 3 denote the same parts, and a description thereof will be omitted.

The PCI-ISA bridge 16 is a bridge LSI connecting the PCI bus 2 and the ISA bus 3, and comprises an interrupt controller 161, a system counter 162, and the like. The interrupt controller 161 accepts a hardware interrupt request signal from each device on the system, and issues an interrupt signal INTR to the CPU 11. The system counter 162 is a counter serving as the operation reference of the entire system.

In the initialization process of this embodiment, the hardware interrupt request signal or the counter value of the system counter 162 is used to initialize a plurality of devices parallel. This initialization process will be explained in detail with reference to FIGS. 8 through 12.

The keyboard controller (KBC) 21 controls an internal keyboard 211, a mouse 212, and an external keyboard 213. The BIOS-ROM 19 stores a POST routine for initializing and testing hardware, a BIOS driver group for providing an operating system and an application program with various functions for hardware accesses, a VGA driver for controlling the display controller 14, and the like.

The POST routine is a program executed first upon powering on the system, and tests and initializes the main memory 13 and respective I/O devices in the system. In this case, the initialization processes of these devices are executed parallel in consideration of wait times necessary for their initialization operations. Management of the wait time necessary for the initialization operation of each device, and switching of a device to be initialized are controlled using the generation timing of the hardware interrupt request signal described above, the comparison result of a counter value prepared for each device with the counter value of the system counter 162, or the like.

An initialization process operation when a plurality of devices are initialized parallel using a hardware interrupt request signal will be described with reference to FIGS. 8 and 9.

Figure 8:
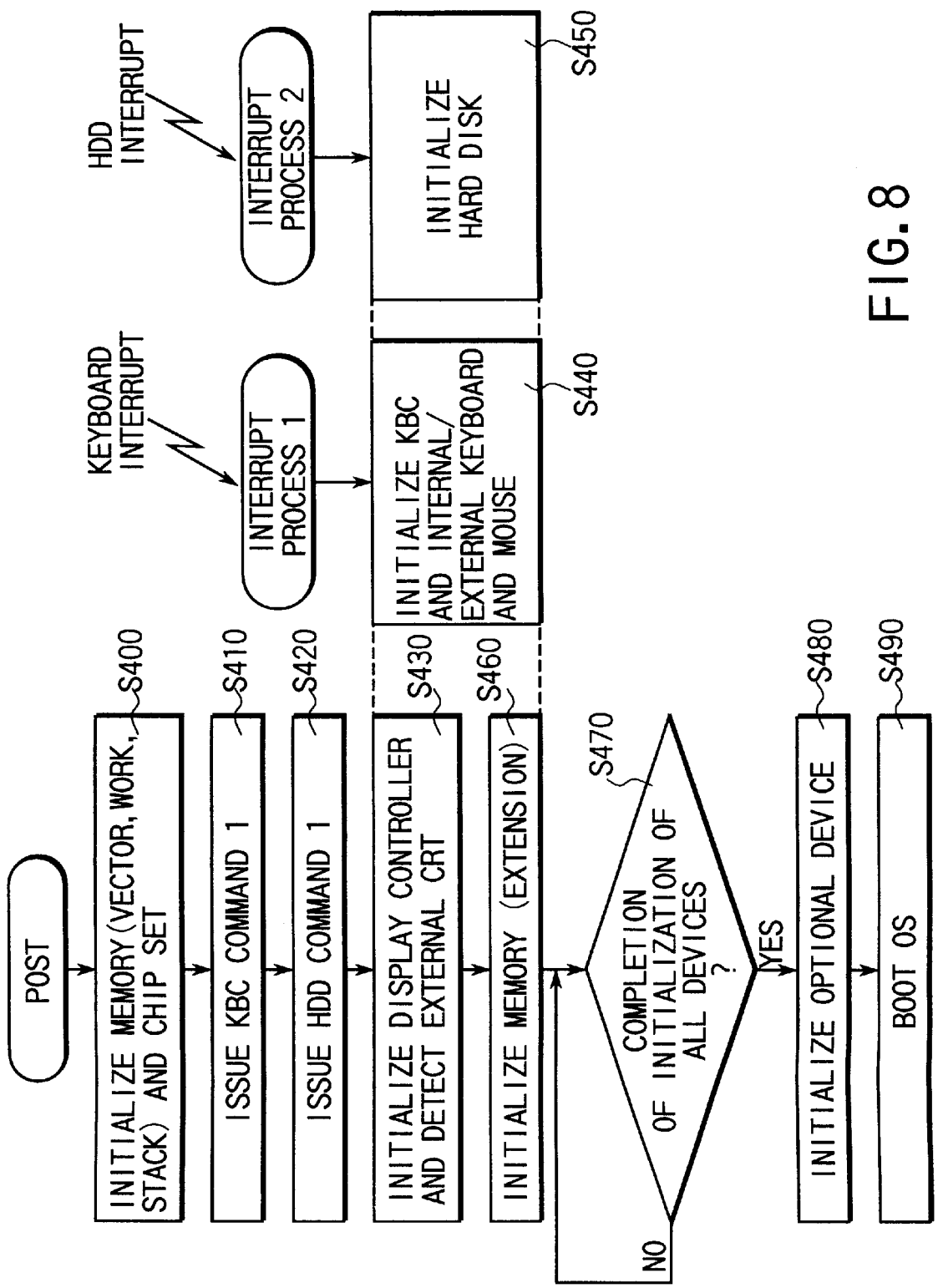
FIG. 8 is a flow chart showing the procedure of the first initialization process for explaining in detail initialization of various devices in step S380 in FIG. 6.
Figure 9:
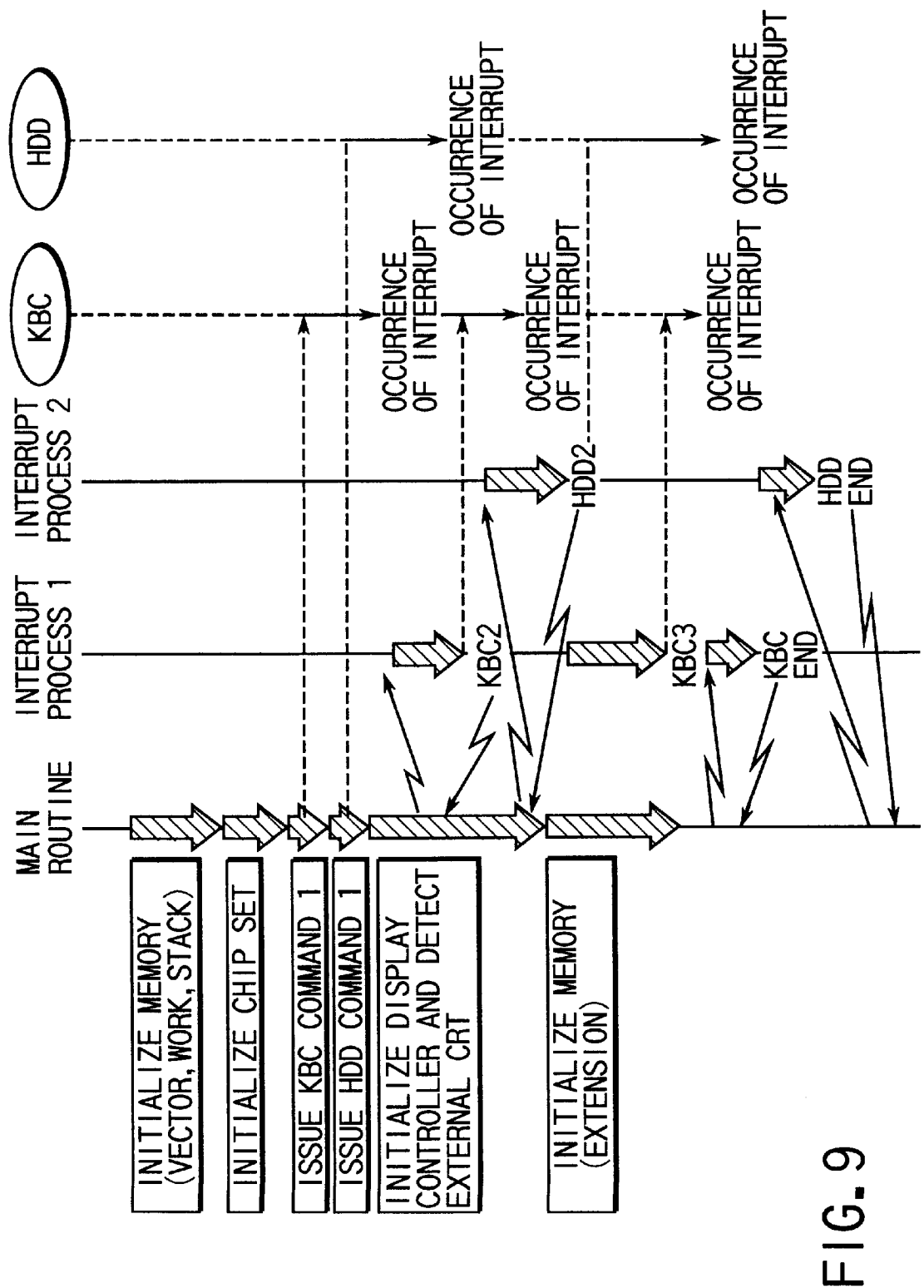
FIG. 9 is a timing chart showing the progress of the first initialization process shown in FIG. 8.

FIG. 8 is a flow chart showing an initialization process procedure executed by the POST routine. FIG. 9 is a timing chart showing the progress of the initialization process.

The initialization process for a plurality of devices in this case is, e.g., as follows.
Memory: Set to Default Value (Cleared to "0")
Optional ROM: (i) Copy Optional ROM in Shadow RAM
  (ii) Execute Optional ROM
HDD: (i) Allocate Resources such as I/O and IRQ
  (ii) Recognize Type of HDD
  (iii) Set Default Value of Work Area
FDD: (i) Determine Whether FDD Operates Normally
  (ii) Set Default Value of Work Area
KBC: (i) Recognize External Keyboard
  (ii) Set Default Value of Keyboard/Mouse
  (iii) Set Default Value of Work Area The POST routine is made up of the main routine and the two, first and second interrupt process routines. The first interrupt process routine initializes the KBC 21, the internal and external keyboards 211 and 213, and the mouse 212, and is activated in response to a hardware interrupt request signal from the KBC 21. The second interrupt control routine initializes the HDD 20 and is activated in response to a hardware interrupt request signal from the HDD 20.

When the computer system is powered on, the POST routine initializes the conventional area of the main memory 13 (sets interrupt vectors for starting the first and second interrupt process routines, and sets a work area and a stack area), and initializes chip sets (e.g., bridges 12 and 16) (step S400).

To initialize the KBC 21, the HDD 20, and the display controller 14 parallel, the POST routine sequentially issues initialization commands (KBC command 1 and HDD command 1) to the KBC 21 and the HDD 20 (steps S410 and S420). Then, the KBC 21 and the HDD 20 start their command processes, and upon completion of the command processes, generate hardware interrupt request signals representing this, as shown in FIG. 9.

The POST routine starts initializing the display controller 14 and detecting an external CRT (step S430). If a hardware interrupt request signal is issued from the KBC 21 during the initialization process of the display controller 14, the control shifts from the currently executed main routine to the first interrupt process routine by the software interrupt function of the CPU 11.

Every time the first interrupt process routine is activated, it checks the status with respect to a KBC command issued before, issues the next command necessary for a subsequent remaining KBC initialization process, and sets a wait time (timeout time; e.g., 1 min in this embodiment) for a command execution completion interrupt in the timer. At this time, the initialization process of the POST routine stops for the timeout time. In this case, if no interrupt occurs even after 1 min, this is regarded as an error, and a predetermined error process is executed. Then, the initialization process of the POST routine resumes. To the contrary, if a command execution completion interrupt is generated by the KBC 21 within 1 min, the initialization process of the POST routine resumes, and which command was issued is saved as log data in a predetermined working area. The first interrupt process routine returns to the main routine (step S440).

Similarly, if a hardware interrupt request signal is issued from the HDD 20, the control shifts from the currently executed routine to the second interrupt process routine by the software interrupt function of the CPU 11. Every time the second interrupt process routine is activated, it checks the status with respect to an HDD command previously issued, issues the next command necessary for a subsequent remaining HDD initialization process, and sets a wait time (timeout time; e.g., 1 min in this embodiment) for a command execution completion interrupt in the timer. At this time, the initialization process of the POST routine stops for the timeout time. In this case, if no interrupt occurs even after 1 min, this is regarded as an error, and a predetermined error process is executed. Then, the initialization process of the POST routine resumes. To the contrary, if a command execution completion interrupt is generated by the HDD 20 within 1 min, the initialization process of the POST routine resumes, and which command was issued is saved as log data in a predetermined working area. The second interrupt process routine returns to the main routine (step S450).

In this manner, the first and second interrupt process routines are continuously executed in synchronism with respective command process completion timings by the KBC 21 and the HDD 20. Accordingly, the display controller 14 can be initialized during the wait times necessary for respective command process operations by the KBC 21 and the HDD 20. The display controller 14, the KBC 21, and the HDD 20 can be initialized parallel.

In the main routine, an initialization process starts for the extension memory area of the main memory 13 upon completion of the initialization process of the display controller 14 (step S460). Even during the initialization process of the extension memory area, the first and second interrupt process routines are respectively executed every time a hardware interrupt signal is generated.

When the initialization process of the extension memory area by the main routine and the initialization of the KBC and the HDD by the first and second interrupt process routines are completed, the POST routine initializes optional devices and boots the operating system (steps S480 and S490).

As described above, in the initialization process method, initialization processes of the display controller 14, the KBC 21, and the HDD 20 progress in accordance with respective command completion interrupt signals from the KBC 21 and the HDD 20. The display controller 14, the KBC 21, and the HDD 20 can therefore be initialized parallel.

The initialization process of the display controller 14 may also be executed using an interrupt routine. In this case, while the extension memory area is initialized by the main routine, the display controller 14, the KBC 21, and the HDD 20 are initialized parallel.

An initialization process operation when a plurality of devices are initialized parallel using the comparison result of a counter value prepared for each device with the counter value of the system counter 162 will be described with reference to FIGS. 10 and 11.

Figure 10:
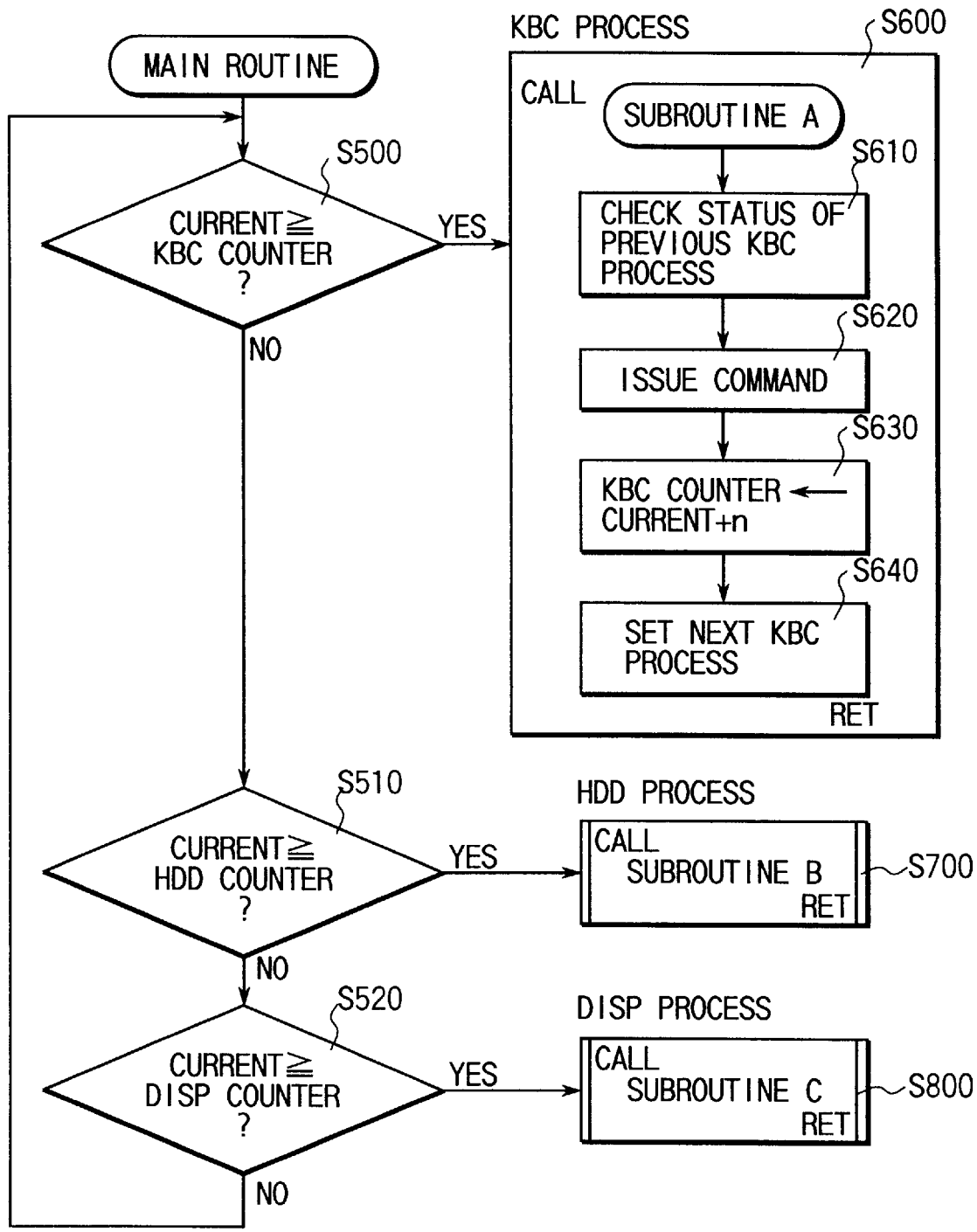
FIG. 10 is a flow chart showing the procedure of the second initialization process for explaining in detail initialization of various devices in step S380 in FIG. 6.

FIG. 10 is a flow chart showing an initialization process procedure executed by the POST routine. FIG. 11 is a timing chart showing the progress of the initialization process.

The POST routine is made up of the main routine and three subroutines A, B, and C. The subroutine A initializes the KBC 21, the internal and external keyboards 211 and 213, and the mouse 212, and is activated in response to a subroutine call from the main routine. The subroutine B initializes the HDD 20, and is activated in response to a subroutine call from the main routine. The subroutine C initializes the display controller 14 and detects an external CRT. The subroutine C is activated in response to a subroutine call from the main routine.

The main routine sequentially compares the counter values of software counters (KBC counter, HDD counter, and display controller (DISP) counter) prepared in correspondence with the KBC 21, the HDD 20, and the display controller 14 with the counter value of the system counter 162 to determine a device which can shift to the next command process. The main routine calls a subroutine corresponding to the device.

The time necessary for a corresponding device to execute the current command process, i.e., the time at which the next command process can start is set in each software counter. Setting of a counter value in each software counter is executed by a subroutine for initializing a device corresponding to the software counter. Until the subroutine is activated, the counter value of each software counter is "0", i.e., the command process can start anytime.

When the computer system is powered on, the POST routine initializes the main memory 13 and chip sets (e.g., bridges 12 and 16), and then sequentially compares the KBC counter value, the HDD counter value, and the DISP counter value with the current counter value (system current value) of the system counter 162 to start a process (steps S500, S510, and S520) for detecting for each device whether the device can start the next command process.

In this case, whether the system current value is equal to or larger than the KBC counter value is checked (step S500). If YES in step S500, the subroutine A is called; if NO, the POST routine shifts to check the HDD counter value.

Immediately after the computer system is powered on, the KBC counter value is an initial value of "0", and thus the system current value is larger than the KBC counter value. Therefore, a KBC initialization process (step S600) is executed by the subroutine A.

In the subroutine A, after the status of a command process with respect to a KBC command issued in the previous subroutine A is checked, the next command for initializing the KBC is issued (steps S610 and S620). The KBC counter value is updated (step S630).

In step S630, "present system current value+n" is set in the KBC counter. "n" represents the minimum time (KBC interval value) required to allow acceptance of the next command upon completion of a process corresponding to the command issued in S620 by the KBC 21. This time is set for each command in advance.

After the KBC counter value is updated, e.g., setting of a calling address in the next KBC initialization process (step S640) is performed, the subroutine A returns to the main routine.

In the main routine, whether the system current value is equal to or larger than the HDD counter value is checked (step S510). If YES in step S510, the subroutine B is called. By the same procedure as in the KBC initialization process described above, an HDD initialization process (step S700) such as the status check of the previous command process, issuing of the next command, and resetting of the HDD counter is performed.

When the subroutine B returns to the main routine, whether the system current value is equal to or larger than the DISP counter value is checked (step S520). If YES in step S520, the subroutine C is called, and a display controller initialization process (step S800) such as the status check of the previous command process, issuing of the next command, and resetting of the DISP counter is performed.

Figure 11:
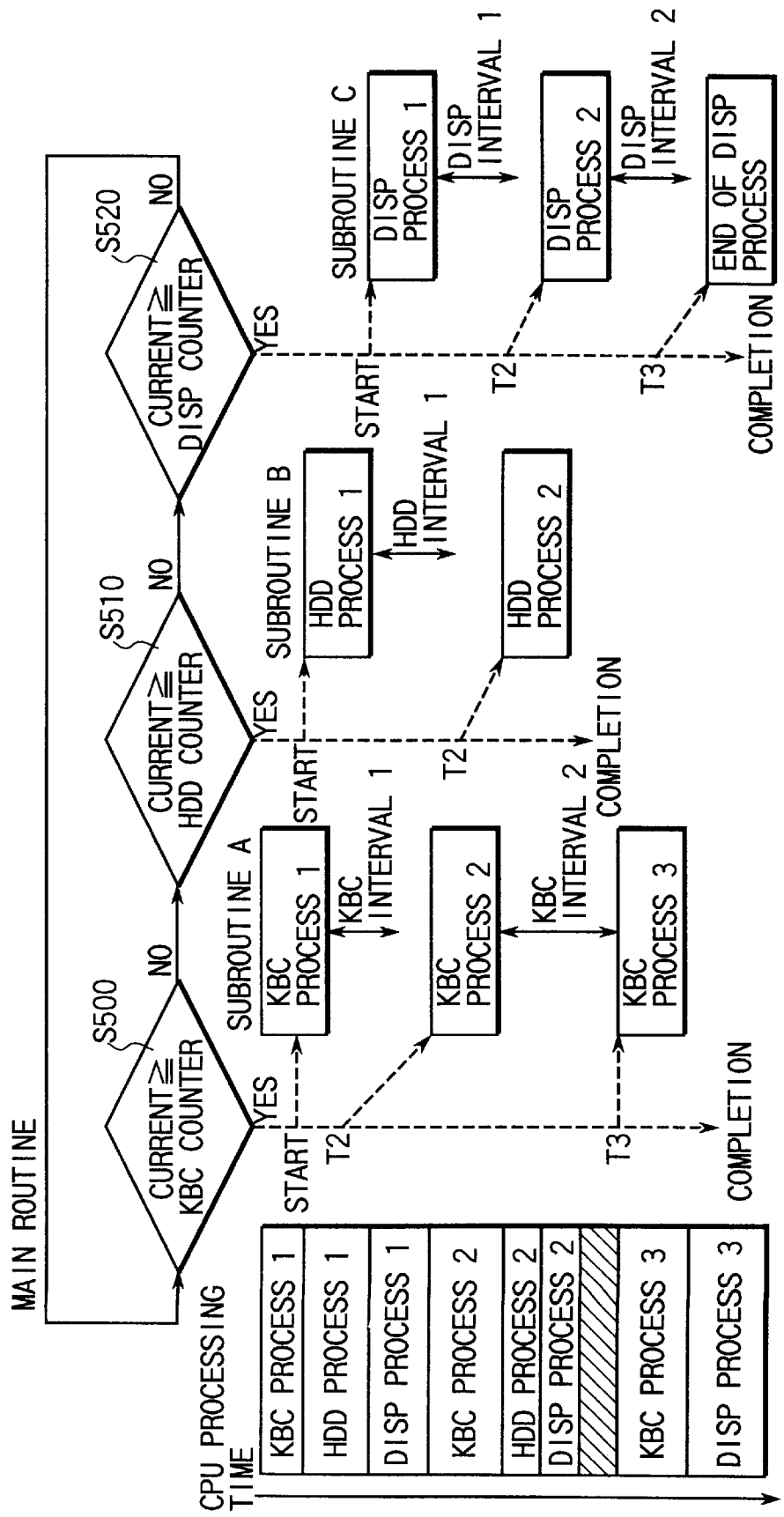
FIG. 11 is a timing chart showing the progress of the second initialization process shown in FIG. 10.
Figure 12:
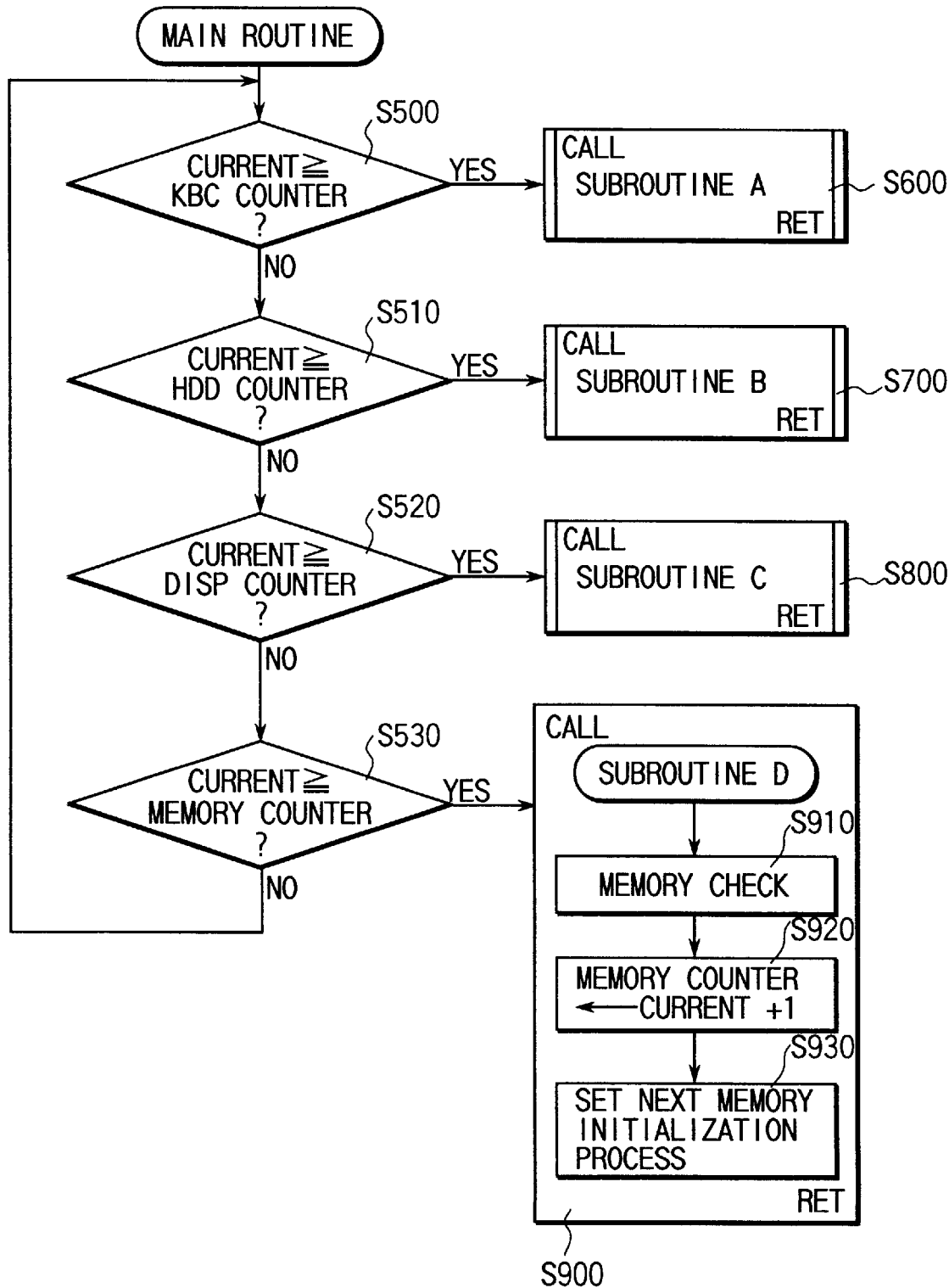
FIG. 12 is a flow chart showing the procedure of the third initialization process for explaining in detail initialization of various devices in step S380 in FIG. 6.

By using the counter value of each device, the timing at which the device can shift to the next command process is detected for each device, and each device is initialized in synchronism with the detected timing, as shown in FIG. 11.

In the example of FIG. 11, when the first KBC initialization process (KBC process 1), the first HDD initialization process (HDD process 1), and the first display initialization process (DISP process 1) are completed, the system current value exceeds the KBC counter value (T2) set in the first KBC initialization process, and the second KBC initialization process (KBC process 2) is performed after T2.

The third KBC initialization process (KBC process 3) is performed after the system current value reaches the KBC counter value (T3) set in the second KBC initialization process. The main routine is kept looped and is in a wait state at an interval between the completion of the second display initialization process (DISP process 2) and the start of KBC process 3.

In this wait period, the above-described initialization process of the extension memory area, and the like can also be performed. In this case, after initializing the conventional area of the main memory 13 and chip sets (e.g., bridges 12 and 16), the POST routine shifts to the process in FIG. 12.

In this case, a memory counter is prepared to control the execution timing of the subroutine C for initializing the extension memory area, in addition to the KBC counter, the HDD counter, and the DISP counter described above.

When the system current value becomes equal to or larger than the memory counter value, a subroutine D is executed to start a memory initialization process (step S900). Every time the subroutine D is executed, e.g., a 1-Mbyte memory is checked (step S910), the memory counter is reset (step S920), and setting for the next memory initialization process is performed (step S930).

In the memory counter resetting process, "present system current value +1" is set in the memory counter. The value "1" is set to always execute the memory initialization process (step S900) every time the counter check in step S530 is performed. With this setting, the memory initialization process can be performed while the initialization process of another device cannot be executed.

Note that whether the device can shift to the next command process is detected by comparing the counter prepared for each device with the system counter. If a down counter is used as the counter prepared for each device, and the time necessary for the command process is set in the down counter, whether the device can shift to the next command process can be detected under the condition of "down counter =0".

As the system counter, a counter in the CPU 11 can also be used.

Figure 15:
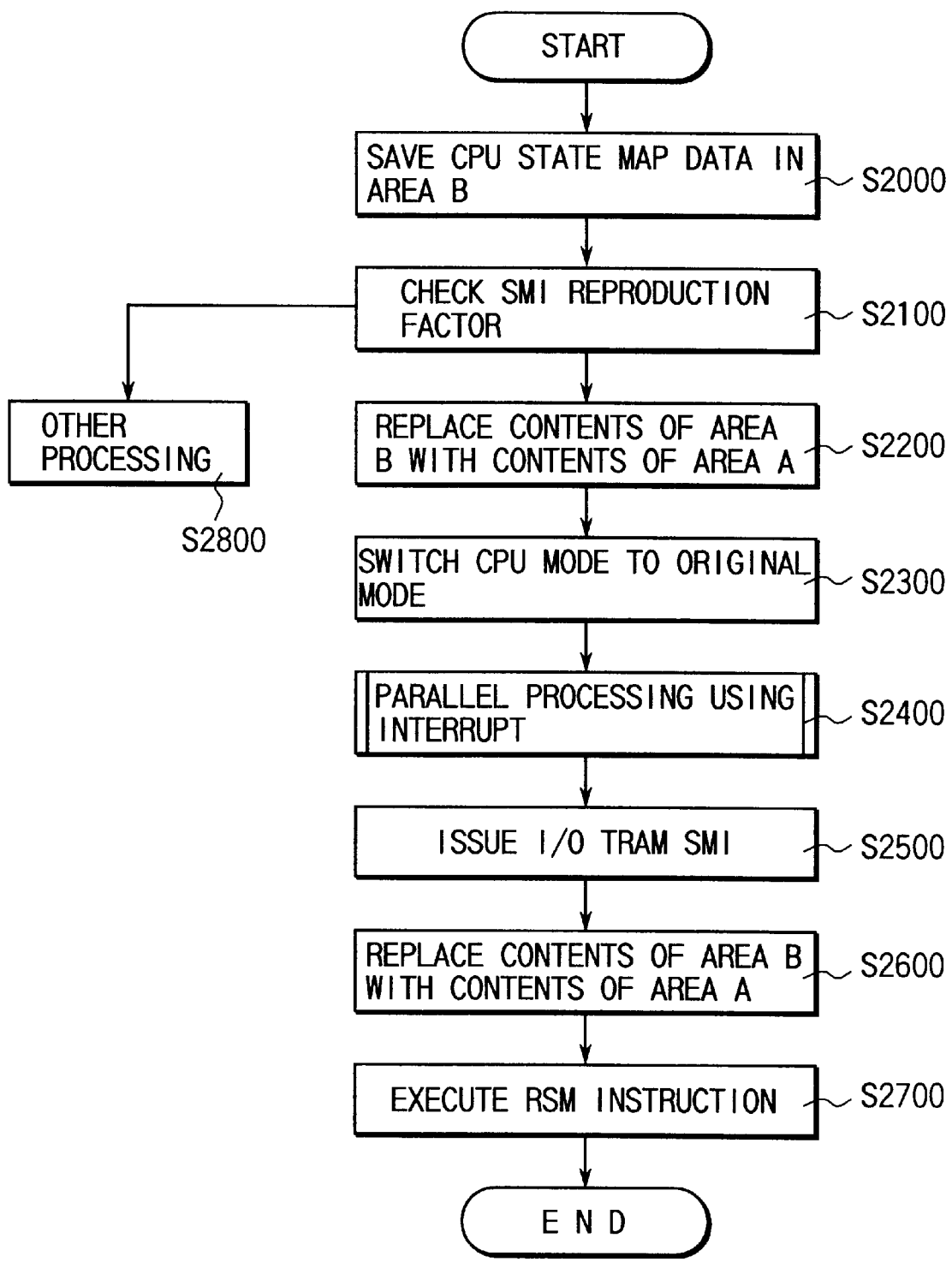
FIG. 15 is a flow chart showing the procedure of an interrupt control process during the activation of the OS in the system of the embodiment.

The operation of an interrupt control process during the activation of the OS will be explained with reference to the flow chart in FIG. 15.

After the control shifts to the OS upon completion of the POST routine of the system BIOS, generation of a suspend/resume request, or generation of a desk station docking/undocking request, i.e., the ON/OFF operation of the power supply switch or a change in docking/undocking state of the docking station 30 is set in the interrupt register 231 of the I/O control gate array 23. Then, issuing of an SMI# signal is requested from the SMI generator 121 via a point-to-point interrupt line. The SMI generator 121 sets a factor bit corresponding to the SMI factor register 122 and issues an SMI# signal to the CPU 11.

When the CPU 11 receives the SMI# signal, the operation mode of the CPU 11 is changed to the SMM, and the CPU state upon occurrence of an interrupt is stored in the area B in the SM-RAM (S2000).

An SM-BIOS at a far jump destination set in the SMI handler in the SM-RAM is activated to check an SMI occurrence factor. The SM-BIOS checks the contents of the SMI factor register 122. If the SM-BIOS determines that the state changes along with the ON/OFF operation of the power supply switch, it replaces CPU state map information stored in the area B of the SM-RAM 132 with CPU state map information saved in the area A in initialization (S2100 and S2200).

In order to switch the operation mode of the CPU 11 to the original mode and perform parallel processing of a rapid suspend process, the SM-BIOS sets the value of a program counter (to be referred to as a PC hereinafter) in the CPU state map information set in initialization at a BIOS-ROM address where the rapid suspend process is stored, and executes an RSM instruction. In response to the RSM instruction, the CPU 11 restores the CPU state map information stored in the area B in the SM-RAM 132 to each register in the CPU 11 (S2300).

Figure 16:
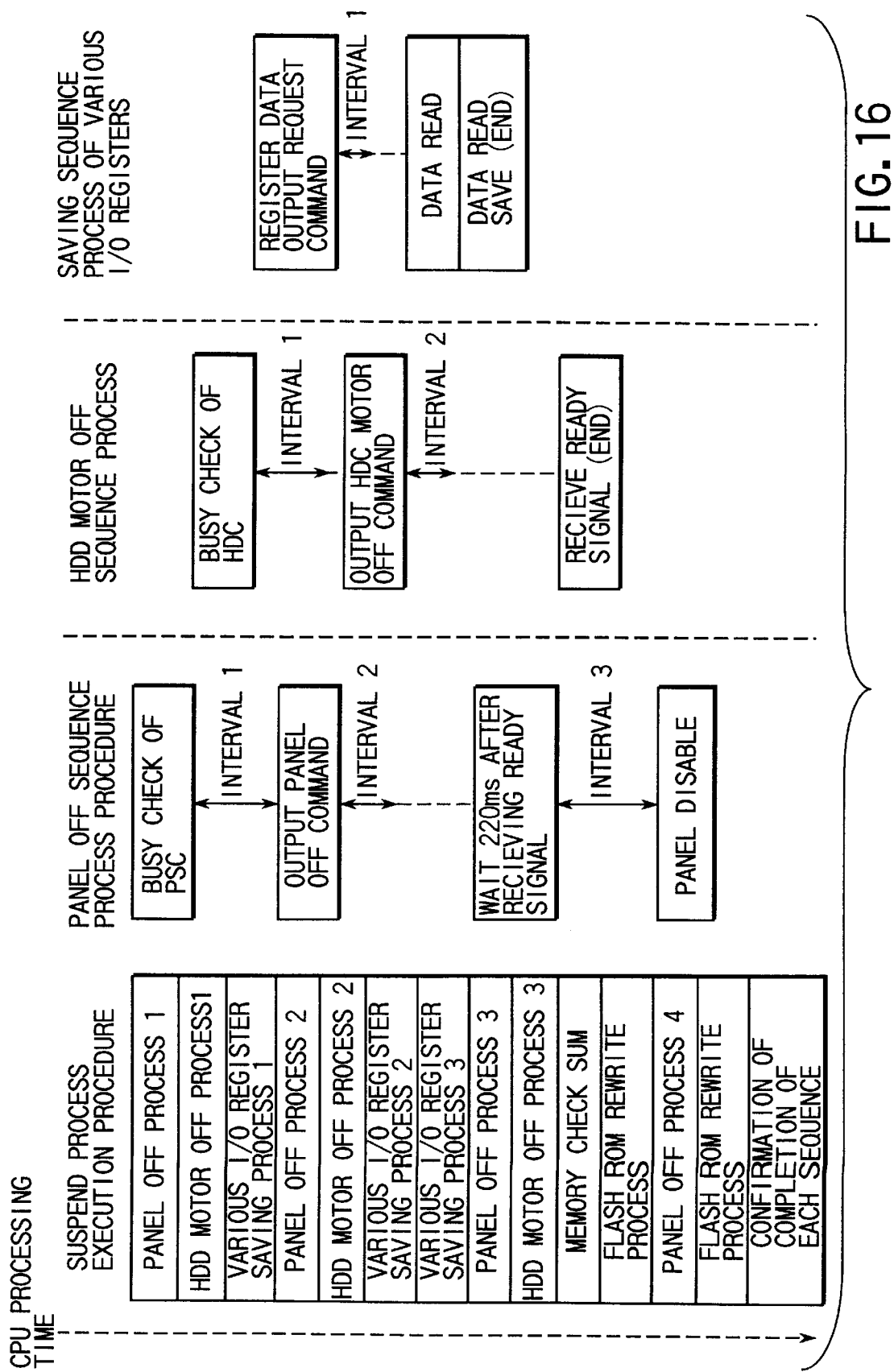
FIG. 16 is a timing chart showing the progress of a parallel rapid suspend process by the CPU in the system of the embodiment.

After the CPU 11 changes to the original mode, the next instruction is executed from an address value set in the PC of the CPU 11, and the parallel processing of the rapid suspend process (to be described later) is executed, as shown in FIG. 16 (S2400).

Upon completion of the parallel processing of the rapid suspend process, the system BIOS issues an I/O trap SMI to the CPU 11. Before issuing the SMI# signal, the system BIOS sets a BIOS function in the SMM mode in the AH register of the CPU 11 (S2500).

After the CPU 11 shifts to the SMM mode, the SM-BIOS is activated. The SM-BIOS checks the SMI factor register 122 to confirm an SMI occurrence factor. Upon confirming that the SMI is issued by the I/O trap SMI, the SM-BIOS checks the AH register value in the area B where the CPU state map information is stored. The SM-BIOS determines the issuing of the SMI in the original mode and replaces the CPU state map information stored in the area B in the SM-RAM 132 with the contents of the area A (S2600).

After executing the RSM instruction, the SM-BIOS restores the CPU state map information stored in the area B in the SM-RAM 132 to the CPU 11 to complete all the interrupt control processes associated with the rapid suspend process (S2700).

Figure 17:
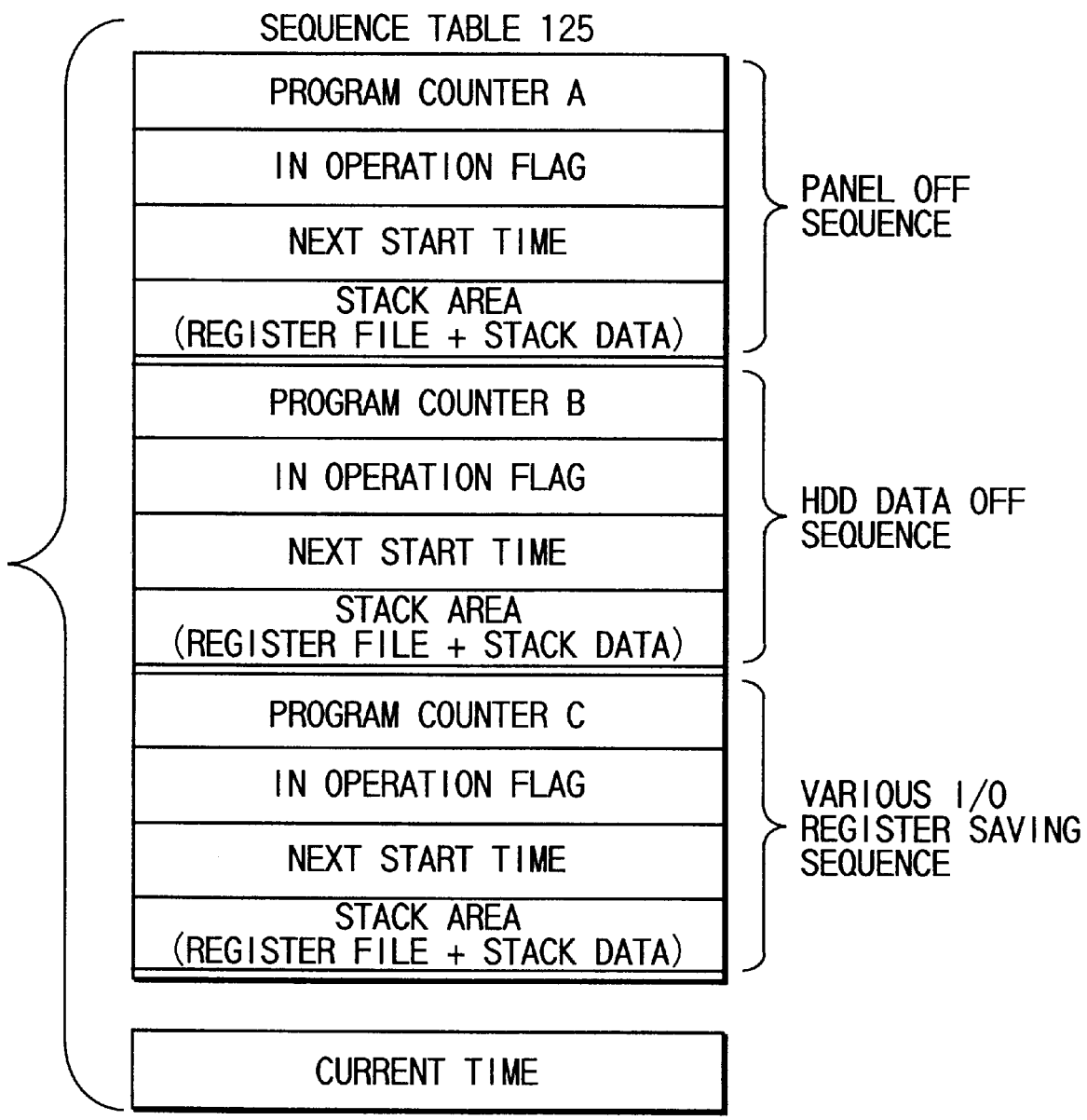
FIG. 17 is a block diagram showing the arrangement of a sequence table set in an SM-RAM in the system of the embodiment.
Figure 18:
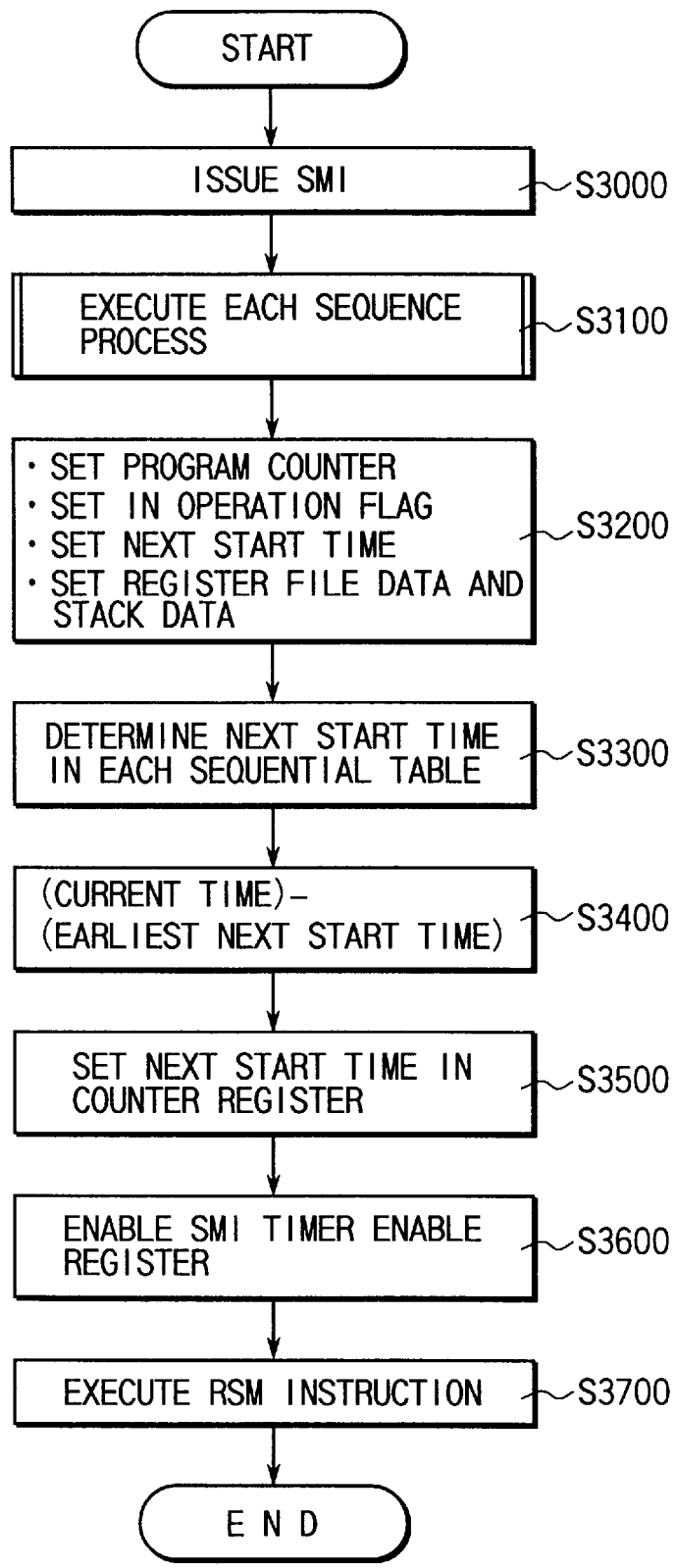
FIG. 18 is a flow chart showing the procedure of each sequence process in the rapid suspend process in the system of the embodiment.

The operation of parallel processing using an interrupt will be described with reference to the progress timing of the CPU process in FIG. 16, each working area information in the sequence table in FIG. 17, and the flow chart of each sequence process in FIG. 18.

To activate a panel off sequence process of the rapid suspend process, the system BIOS sets a BIOS function in the AH register of the CPU 11 and issues the I/O trap SMI to the CPU 11 (S3000).

After the operation mode of the CPU 11 shifts to the SMM, the panel off sequence process is called. The panel off sequence process first requests busy check of the power supply controller 24 (S3100). Since the busy check of the power supply controller 24 spends a predetermined interval (wait time), the panel off sequence process sets a current program counter value "A", a flag representing that the panel off sequence process is in operation, an interval timer value (next start time: interval 1), register file information, and stack information in a sequence table 125 in the SM-RAM 132 upon requesting the busy check of the power supply controller 24 (S3200).

The panel off sequence process reads the next start time values in respective sequence tables 125, determines a sequence having the earliest start time, and sets a value obtained by subtracting the selected earliest start time from the current time in the count register 124 (S3300, S3400, and S3500). In this case, since only the operation flag of the panel off sequence process is set, the earliest next start time is the start time of the panel off sequence.

After setting the next start time in the count register 124, the panel off sequence process sets the SMI timer enable register 123 and starts the count-down of the count register 124 (S3600).

The panel off sequence process executes the RSM instruction and returns to the main routine of the rapid suspend process (S3700).

After the process returns to the main routine of the rapid suspend process, the rapid suspend process sets an SM-BIOS function in the AH register of the CPU 11, and issues the I/O trap SMI to the CPU 11 to activate an HDD motor off sequence process (S3000).

The activated HDD motor off sequence process first requests busy check of a hard disk controller incorporated in the HDD 20 (S3100). Since the busy check of the hard disk controller spends a predetermined interval (wait time), the HDD motor off sequence process sets a current program counter value "B", a flag representing that the hard disk controller off sequence process is in operation, an interval timer value (next start time: interval 1), register file information, and stack information in the sequence table 125 in the SM-RAM 132 upon requesting the busy check of the hard disk controller (S3200).

The hard disk controller off sequence process reads the next start time values in the respective sequence tables, determines a sequence having the earliest start time, and sets a value obtained by subtracting the selected earliest start time from the current time in the count register 124 (S3300, S3400, and S3500). In this case, since the next start time of the panel off sequence process is earlier than the next start time of the HDD motor off sequence process, the earliest next start time is the start time of the panel off sequence.

The HDD motor off sequence process sets the next start time of the panel off sequence in the count register 124, then sets the SMI timer enable register 123, and starts the count-down of the count register 124 (S3600).

The HDD motor off sequence process executes the RSM instruction and returns to the main routine of the rapid suspend process (S3700).

After the process returns to the main routine of the rapid suspend process, the rapid suspend process sets an SM-BIOS function in the AH register of the CPU 11, and issues the I/O trap SMI to the CPU 11 to activate a saving sequence process of various I/O registers (S3000).

The saving sequence process of various I/O registers issues a command in order to request output of data stored in various I/O registers (S3100). Since the data output request process of various I/O registers spends a predetermined interval (wait time), the saving sequence process of various I/O registers sets a current program counter value "C", a flag representing that the saving sequence process of various I/O registers is in operation, an interval timer value (next start time: interval 1), register file information, and stack information in the sequence table 125 in the SM-RAM 132 upon outputting the command (S3200).

The saving sequence process of various I/O registers reads the next start time values in the respective sequence tables, determines a sequence having the earliest start time, and sets a value obtained by subtracting the selected earliest start time from the current time in the count register 124 (S3300, S3400, and S3500). In this case, since the next start time of the panel off sequence process is earlier than the next start time of the HDD motor off sequence process and the next start time of the saving sequence process of various I/O registers, the earliest next start time is the start time of the panel off sequence.

The saving sequence process of various I/O registers sets the next start time of the panel off sequence in the count register 124, then sets the SMI timer enable register 123, and starts the count-down of the count register 124 (S3600).

The saving sequence process of various I/O registers executes the RSM instruction and returns to the main routine of the rapid suspend process (S3700).

In this case, since the start time of the panel off sequence process has already passed, the count register 124 is cleared to "0" immediately after the saving sequence process of various I/O registers executes the RSM instruction. In response to "0" of the count register 124, the I/O trap SMI is issued to the CPU 11. The SM-BIOS looks up the respective sequence tables in the SM-RAM 132 to restore the contents saved in the stack area in the sequence table of the panel off sequence process having the earliest start time, and executes the panel off sequence process (S3000).

The panel off sequence process first performs busy check of the power supply controller 24, and then outputs a panel off command to the power supply controller 24 (S3100). Since the power supply controller 24 spends a predetermined interval (wait time) to execute a panel off command process, the panel off sequence process sets a current program counter value "A2", a flag representing that the panel off sequence process is in operation, an interval timer value (next start time: interval 2), register file information, and stack information in the sequence table 125 in the SM-RAM 132 upon outputting the panel off command (S3200).

The panel off sequence process reads the next start time values in the respective sequence tables 125, determines a sequence having the earliest start time, and sets a value obtained by subtracting the selected earliest start time from the current time in the count register 124 (S3300, S3400, and S3500). In this case, the operation flags of the panel off sequence process, the HDD motor off sequence process, and the saving sequence process of various I/O registers are set. The earliest next start time is the start time of the HDD motor off sequence.

After setting the next start time in the count register 124, the panel off sequence process sets the SMI timer enable register 123 and starts the count-down of the count register 124 (S3600).

The panel off sequence process executes the RSM instruction and returns to the main routine of the rapid suspend process (S3700).

Since the start time of the HDD motor off sequence process has already passed, the count register 124 is cleared to "0" immediately after the panel off sequence process executes the RSM instruction. In response to "0" of the count register 124, the I/O trap SMI is issued to the CPU 11. The SM-BIOS executes the HDD motor off sequence process having the earliest start time in the respective sequence tables in the SM-RAM 132 (S3000).

The HDD motor off sequence process performs busy check of the hard disk controller, and then outputs a hard disk controller motor off command to the hard disk controller (S3100). Since the hard disk controller spends a predetermined interval (wait time) to execute a motor off command process, the HDD motor off sequence process sets a current program counter value "B2", a flag representing that the HDD motor off sequence process is in operation, an interval timer value (next start time: interval 2), register file information, and stack information in the sequence table 125 in the SM-RAM 132 upon outputting the motor off command to the hard disk controller (S3200).

The HDD motor off sequence process reads the next start time values in the respective sequence tables 125, determines a sequence having the earliest start time, and sets a value obtained by subtracting the selected earliest start time from the current time in the count register 124 (S3300, S3400, and S3500). In this case, the operation flags of the panel off sequence process, the HDD motor off sequence process, and the saving sequence process of various I/O registers are set. The earliest next start time is the start time of the saving sequence process of various I/O registers.

After setting the next start time in the count register 124, the HDD motor off sequence process sets the SMI timer enable register 123 and starts the countdown of the count register 124 (S3600).

The HDD motor off sequence process executes the RSM instruction and returns to the main routine of the rapid suspend process (S3700).

Since the start time of the saving sequence process of various I/O registers has already passed, the count register 124 is cleared to "0" immediately after the HDD motor off sequence process executes the RSM instruction. In response to "0" of the count register 124, the I/O trap SMI is issued to the CPU 11. The SM-BIOS executes the saving sequence process of various I/O registers having the earliest start time in the respective sequence tables in the SM-RAM 132 (S3000).

The saving sequence process of various I/O registers receives ready signals from various I/O registers in response to output of a register data request command. The saving sequence process of various I/O registers reads register data in various I/O registers, and saves the data in a predetermined backup area in the system memory (S3100). The saving sequence process of various I/O registers sets a flag representing that the saving sequence process of various I/O registers is completed, register file information, and stack information in the sequence table 125 in the SM-RAM 132 (S3200).

The saving sequence process of various I/O registers reads the next start time values in the respective sequence tables, determines a sequence having the earliest start time, and sets a value obtained by subtracting the selected earliest start time from the current time in the count register 124 (S3300, S3400, and S3500). In this case, the operation flags of the panel off sequence process and the HDD motor off sequence process are set. The earliest next start time is the start time of the panel off sequence process.

After setting the next start time in the count register 124, the saving sequence process of various I/O registers sets the soft SMI timer enable register 123 and starts the count-down of the count register 124 (S3500).

The saving sequence process of various I/O registers executes the RSM instruction and returns to the main routine of the rapid suspend process (S3700).

Since the start time of the panel off sequence process has already passed, the count register 124 is cleared to "0" immediately after the saving sequence process of various I/O registers executes the RSM instruction. In response to "0" of the count register 124, the I/O trap SMI is issued to the CPU 11. The activated SM-BIOS refers to the respective sequence tables 125 in the SM-RAM 132 to restore the contents saved in the stack area in the sequence table of the panel off sequence process having the earliest start time, and executes the panel off sequence process (S3000).

The panel off sequence process receives a ready signal from the power supply controller 24 in response to a panel off command output. The panel off sequence process waits 220 ms after receiving the ready signal (S3100). The panel off sequence process sets a current program counter value "A3", a flag representing that the panel off sequence process is in operation, an interval timer value (next start time: interval 3), register file information, and stack information in the sequence table 125 in the SM-RAM 132 (S3200).

The panel off sequence process reads the next start time values in the respective sequence tables 125, determines a sequence having the earliest start time, and sets a value obtained by subtracting the selected earliest start time from the current time in the count register 124 (S3300, S3400, and S3500). In this case, the operation flags of the panel off sequence process and the HDD motor off sequence process are set. The earliest next start time is the start time of the HDD motor off sequence.

After setting the next start time in the count register 124, the panel off sequence process sets the soft SMI timer enable register 123 and starts the count-down of the count register 124 (S3600).

The panel off sequence process executes the RSM instruction and returns to the main routine of the rapid suspend process (S3700).

Since the start time of the HDD motor off sequence process has already passed, the count register 124 is cleared to "0" immediately after the panel off sequence process executes the RSM instruction. In response to "0" of the count register 124, the I/O trap SMI is issued to the CPU 11. The activated SM-BIOS refers to the respective sequence tables 125 in the SM-RAM 132 to restore the contents saved in the stack area in the sequence table of the HDD motor off sequence process having the earliest start time, and executes the HDD motor off sequence process (S3000).

The HDD motor off sequence process receives a ready signal from the hard disk controller in response to a hard disk controller off command output (S3100). The HDD motor off sequence process sets a flag representing that the HDD motor off sequence process is completed, register information, and stack information (S3200).

The HDD motor off sequence process reads the next start time values in the respective sequence tables 125, determines a sequence having the earliest start time, and sets a value obtained by subtracting the selected earliest start time from the current time in the count register 124 (S3300, S3400, and S3500). In this case, the operation flag of only the panel off sequence process is set. The earliest next start time is the start time of the panel off sequence process.

After setting the next start time in the count register 124, the HDD motor off sequence process sets the soft SMI timer enable register 123 and starts the count-down of the count register 124 (S3600).

The HDD motor off sequence process executes the RSM instruction and returns to the main routine of the rapid suspend process (S3700).

The main routine of the rapid suspend process executes check sum of the memory 13 and saves the results in a predetermined area of the memory. The main routine of the rapid suspend process saves password information and PnP information in the BIOS-ROM 19. When the count of the count register 124 reaches "0" during the rewrite of the BIOS-ROM 19, the I/O trap SMI is issued to the CPU 11 (S3000). The rewrite process of the BIOS-ROM 19 temporarily stops, and the status map information of the CPU 11 is stored in the area B in the SM-RAM. An SM-BIOS process is activated on the basis of a function set in the AH register of the CPU.

The activated SM-BIOS confirms the contents of the SMI factor register 122 and the like, and executes the panel off sequence process. The panel off sequence process waits 220 ms, disables the LCD panel, and sets a flag representing that the panel off sequence process is completed (S3100 and S3200).

Since all the operation flags in the respective sequence tables 125 represent completion, the panel off sequence process does not set any time in the count register 124, executes the RSM instruction, restores the CPU state map information stored in the area B in the SM-RAM 132 to the CPU, and returns to the main routine of the rapid suspend process (S3300 to S3700).

The rewrite process of the BIOS-ROM 19 resumes from an interrupted portion and is completed. The main routine of the rapid suspend process confirms the operation flags in the SM-RAM 132 to check whether all the sequence processes are completed. After confirming that all the sequence processes are completed, parallel processing (rapid suspend process) using an interrupt is completed.

With an arrangement like the one in this embodiment, a response from an I/O device can be accepted by an interrupt control process after the CPU 11 is switched to the original mode. Therefore, the response can be detected more reliably than by polling.

For example, even if the power supply switch is depressed during the activation of the OS and depressed again during the execution of the rapid suspend process, the power supply controller 24 sets the ON/OFF state of the power supply switch in the interrupt register within the I/O control GA 23. The interrupt register 231 is connected to the SMI generator 121 via a dedicated point-to-point interrupt line. By setting bits corresponding to the change in state of the interrupt register 231, an SMI# signal can be issued to the CPU 11.

The embodiment of the present invention has exemplified the parallel operation of the rapid suspend process. A normal suspend/resume process and a process including a docking/undocking process that is executed by the BIOS can also be performed parallel by switching the CPU to the original mode.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. A computer system for executing a predetermined process in a system management mode in which no interrupt request is accepted, the system comprising:

means for generating a system management interrupt request during operation of an OS;

means for changing an operation mode of a CPU to the system management mode in response to the system management interrupt request;

means for setting the mode of said CPU to an interrupt usable mode indicative of a state in which any interrupt request is acceptable after the mode of said CPU is changed to the system management mode; and means for executing an interrupt control process in the interrupt request usable mode.

2. A system according to claim 1, wherein said means for setting the mode of said CPU to the system management mode comprises means for saving CPU state map information in a first area of a memory upon reception of the system management interrupt request.

3. A system according to claim 2, wherein said means for executing the interrupt control process in the interrupt request usable mode comprises means for executing interrupt control processes in parallel.

4. A system according to claim 3, wherein said means for setting said CPU to the interrupt usable mode comprises means for saving CPU state map information in a second area of said memory in an initialization process of said system.

5. A system according to claim 4, wherein said means for setting said CPU to the interrupt usable mode comprises means for replacing the saved CPU state map information saved in the first area of said memory with the saved CPU state map information saved in the second area.

6. A system according to claim 5, wherein said means for setting said CPU to the interrupt usable mode comprises means for executing a return (RSM) instruction and setting, in said CPU, the saved CPU state map information saved in the first area of said memory when the mode of said CPU is the system management mode.

7. A system according to claim 6, further comprising:
   means for generating a system management interrupt request to change the mode of said CPU to the system management mode again upon completion of the interrupt control process in the interrupt request usable mode of said CPU;
   means for saving CPU state map information in the first area of said memory in response to the system management interrupt request; and
   means for replacing the saved CPU state map information saved in the first area of said memory with the saved CPU state map information saved in the second area.

8. A system according to claim 7, further comprising:
   means for setting, in said CPU, the saved CPU state map information saved in the first area of said memory when the system management mode returns to a previous CPU mode of said means for generating the interrupt request.

9. A system according to claim 1, wherein the interrupt control process is at least one of a suspend/resume process and an external device docking/undocking process.

10. A computer system having a plurality of devices and executing an initialization process of each device upon turning on a power supply, said system comprising:
    main process means for executing a process not requiring a time wait; and
    subprocess means for executing an initialization process of each device using an interrupt, said subprocess means issuing a command for the initialization process of each device in response to the interrupt signal and returning to said main process means.

11. A system according to claim 10, wherein, after a device of said plurality of devices completes a process corresponding to the command, said subprocess means issues a next command for the initialization process of said device in response to a command completion interrupt from said device.

12. A system according to claim 10, wherein said subprocess means inquires whether a device of said plurality of devices completes a process of a corresponding command, and upon completion of the process, issues a next command for the initialization process of said device.

13. A system according to claim 10, wherein said main process means is an initialization process in a protect mode, and said subprocess means is an initialization process in a system management mode.

14. A system according to claim 13, wherein the initialization process in the protect mode comprises a memory initialization process, a register setting process, and optional ROM execution, and the initialization process in the system management mode comprises an initialization process of I/O devices including a hard disk drive (HDD), a floppy disk drive (FDD), and a keyboard controller (KBC).

15. A system according to claim 14, wherein the command for the initialization process is to output "0ADh" to "64h" of an I/O port in the initialization process of said KBC, and to output "0Ech" to "1F7h" of said I/O port in the initialization process of said HDD.

16. A computer system having a plurality of devices and executing an initialization process of each device upon turning on a power supply, said system comprising:
    main process means for executing a process not requiring a time wait;
    counter means, arranged for an initialization process of each device, for counting a time until a next process resumes;
    means for generating an interrupt signal in response to completion of counting, by each counter means, the time until the next process of the initialization process resumes; and
    subprocess means for executing the initialization process of each device using an interrupt, said subprocess means issuing a command for the initialization process of each device in response to the interrupt signal, setting completion time of a process corresponding to the command in said counter means, and returning to said main process means.

17. A system according to claim 16, further comprising means for causing said subprocess means to resume the next process of the initialization process of each device when said counter means completes the counting, or one of command completion interrupts is satisfied.

18. A computer system having a plurality of devices and executing an initialization process of each device upon turning on a power supply, said system comprising:
    first initialization process means for executing an initialization process not requiring a command completion wait and a time wait;
    counter means in which time to resume a next process of an initialization process requiring the command completion wait and the time wait is set;
    means for generating an interrupt signal in response to completion of counting, by said counter means, a time until the next process of the initialization process resumes; and
    second initialization process means for executing initialization processes requiring the command completion wait and the time wait in parallel during execution of an initialization process not requiring the command completion wait and the time wait, said second initialization process means issuing a command for the initialization process requiring the command completion wait and the time wait in response to the interrupt signal, and setting a shortest time of times to resume a next process of the initialization process requiring the command completion wait and the time wait.

19. An initialization process execution method in a computer system having a plurality of devices and executing an initialization process of each device upon turning on a power supply, the method comprising the steps of:
    executing a process not requiring a time wait by a main program; and
    executing an initialization process of each device using an interrupt by a subprogram in parallel to the execution of the process by the main program, issuing a command for the initialization process of each in response to an interrupt signal, and returning to the main program.

20. An initialization process method in a computer system having a plurality of devices and executing an initialization process of each device upon turning on a power supply, the method comprising the steps of:
    executing a process not requiring a time wait;
    counting, by a counter, a time until a next process of the initialization process resumes;

generating an interrupt signal in response to completion of the counting; and issuing a command for the initialization process of each device in response to the interrupt signal, setting completion time of a process corresponding to the command in said counter, and executing the process not requiring the time wait.

21. An initialization process method in a computer system having a plurality of devices and executing an initialization process of each device upon turning on a power supply, the method comprising the steps of:

executing an initialization process not requiring a command wait or a time wait;

setting, in a counter, time to resume a next process of an initialization process requiring the command completion wait and the time wait;

generating an interrupt signal in response to completion of counting, by said counter, a time until the next process of the initialization process resumes; and setting, in said counter, a shortest time of times to resume the next process of the initialization process requiring the command completion wait and the time wait during the execution of the initialization process not requiring the command completion wait and the time wait.

22. An interrupt control process method in a computer system that executes a predetermined process in a system management mode in which no interrupt request is accepted, the method comprising the steps of:

generating a system management interrupt request during operation of an OS;

changing a mode of a CPU to the system management mode in response to the system management interrupt request;

setting the mode of said CPU to an interrupt usable mode indicative of a state in which any interrupt request is acceptable, after the mode of said CPU is changed to the system management mode; and executing an interrupt control process in the interrupt request usable mode.

23. An interrupt control process method in a computer system that executes a predetermined process in a system management mode in which no interrupt request is accepted, the method comprising the steps of:

saving CPU state map information in a first area of a memory in an initialization process of said system:

generating a system management interrupt request during operation of an OS;

saving CPU state map information in a second area of said memory upon reception of the system management interrupt request, and changing the mode of said CPU to said system management mode;

setting the mode of said CPU to an interrupt usable mode indicative of a state in which any interrupt request is acceptable, by swapping the saved CPU state map information saved in the second area of said memory with the saved CPU state map information saved in the first area of said memory after the mode of said CPU is changed to the system management mode; and executing an interrupt control process in the interrupt request usable mode.

24. An initialization process execution method in a computer system having a plurality of devices and executing an initialization process of each device upon turning on a power supply, the method comprising the steps of:

executing an initialization process not requiring a time wait;

sequentially issuing at least one initialization command in parallel to the execution of the initialization process not requiring the time wait;

causing a device of said plurality of devices to execute a process corresponding to the command in response to the issued command, and to generate, upon completion of the command process, a hardware interrupt request signal representing the completion;

shifting a currently executed main routine to an interrupt process routine in response to the interrupt request signal from said device during the execution of the initialization process not requiring the time wait; and causing the interrupt process routine to issue a next command necessary for a subsequent remaining device initialization process every time the interrupt process routine is activated, and to return to the main routine.

25. A suspend process method in a computer system for executing a predetermined process in a system management mode in which no interrupt request is accepted, comprising the steps of:

issuing a system management interrupt request (SMI) to set an operation mode of a CPU to a system management mode;

executing various sequence processes by said CPU in the system management mode;

setting a current program counter value, a flag representing that a sequence process is in operation, next start time, register file information, and stack information in a sequence table in an SM-RAM;

reading next start time values in respective sequence tables, determining a sequence having the earliest start time, and setting a value obtained by subtracting the selected earliest start time from a current time in a counter;

setting SMI timer enable in an SMI timer enable register, and starting count-down of said counter; and executing a return instruction to return to a main routine of the suspend process.

* * * * *

UNITED STATES PATENT AND TRADEMARK OFFICE
CERTIFICATE OF CORRECTION

PATENT NO.  : 6,038,632
DATED       : March 14, 2000
INVENTOR    : Hiroshi YAMAZAKI et al.

It is certified that error appears in the above-identified patent and that said Letters Patent is hereby corrected as shown below:

Claim 1, Col. 20, line 47, after "acceptable", insert --,--.

Signed and Sealed this

Twentieth Day of March, 2001

Attest:

NICHOLAS P. GODICI

*Attesting Officer*      *Acting Director of the United States Patent and Trademark Office*